United States Patent
Miglioranza

(10) Patent No.: US 9,634,518 B2
(45) Date of Patent: Apr. 25, 2017

(54) METHOD AND SYSTEM FOR SUPPLYING ELECTRICAL ENERGY FROM A BATTERY POWER SUPPLY UNIT TO A HEATING ELEMENT

(75) Inventor: Federico Miglioranza, Schio—VI (IT)

(73) Assignee: Campagnolo S.r.l., Vicenza (IT)

( * ) Notice: Subject to any disclaimer, the term of this patent is extended or adjusted under 35 U.S.C. 154(b) by 1271 days.

(21) Appl. No.: 11/772,735

(22) Filed: Jul. 2, 2007

(65) Prior Publication Data

US 2008/0124616 A1    May 29, 2008

(30) Foreign Application Priority Data

Jul. 4, 2006  (IT) .......................... MI2006A001295

(51) Int. Cl.
*H02J 7/14*    (2006.01)

(52) U.S. Cl.
CPC ........... *H02J 7/1407* (2013.01); *H02J 7/1453* (2013.01)

(58) Field of Classification Search
CPC .............................. H02J 7/1407; H02J 7/1453
USPC ............................ 320/135, 136, 150; 429/62
See application file for complete search history.

(56) References Cited

U.S. PATENT DOCUMENTS

| | | | | |
|---|---|---|---|---|
| 2,516,048 A | * | 7/1950 | Endress | 429/62 |
| 5,339,018 A | | 8/1994 | Brokaw | |
| 5,599,636 A | * | 2/1997 | Braun | 429/7 |
| 5,710,507 A | | 1/1998 | Rosenbluth et al. | |
| 5,795,664 A | * | 8/1998 | Kelly | 429/7 |
| 5,834,131 A | * | 11/1998 | Lutz et al. | 429/7 |
| 6,002,240 A | * | 12/1999 | McMahan et al. | 320/150 |
| 6,181,103 B1 | | 1/2001 | Chen | |
| 6,188,202 B1 | * | 2/2001 | Yagi et al. | 320/150 |
| 6,246,600 B1 | | 6/2001 | Thandiwe | |
| 6,271,648 B1 | * | 8/2001 | Miller | 320/150 |
| 6,275,008 B1 | * | 8/2001 | Arai et al. | 320/132 |
| 6,440,602 B1 | * | 8/2002 | Morita | 429/120 |
| 6,456,041 B1 | * | 9/2002 | Terada et al. | 320/132 |
| 6,624,615 B1 | * | 9/2003 | Park | 320/150 |
| 6,861,824 B1 | | 3/2005 | Liu et al. | |
| 6,917,283 B2 | | 7/2005 | Takeda | |
| 7,189,942 B2 | * | 3/2007 | Kotani et al. | 219/202 |
| 2002/0070710 A1 | | 6/2002 | Yagi et al. | |
| 2003/0080713 A1 | * | 5/2003 | Kirmuss | 320/150 |
| 2003/0186111 A1 | | 10/2003 | Tamakoshi | |

(Continued)

FOREIGN PATENT DOCUMENTS

| | | |
|---|---|---|
| CN | 1750317 | 3/2006 |
| DE | 2455872 | 5/1975 |

(Continued)

OTHER PUBLICATIONS

Chinese Office Action and English translation for App. No. 200710127149.6—dated Mar. 5, 2012.

(Continued)

*Primary Examiner* — Richard Isla Rodas
*Assistant Examiner* — Manuel Hernandez
(74) *Attorney, Agent, or Firm* — Volpe and Koenig, P.C.

(57) ABSTRACT

In order to improve the performance of a battery power supply unit for a bicycle electronic device at low atmospheric temperature, when its temperature is less than or equal to a lower temperature threshold, electrical energy is supplied by the power supply unit to a heating element thermally coupled with the power supply unit that, in this way, self-heats. Part of the electrical energy of the power supply unit can be simultaneously supplied to the electronic device.

59 Claims, 18 Drawing Sheets

(56) References Cited

U.S. PATENT DOCUMENTS

| | | | |
|---|---|---|---|
| 2005/0017690 A1* | 1/2005 | Kamenoff | 320/150 |
| 2005/0274705 A1 | 12/2005 | Zhu et al. | |
| 2006/0012342 A1 | 1/2006 | Kamenoff | |
| 2006/0028182 A1* | 2/2006 | Yang et al. | 320/150 |
| 2008/0042621 A1* | 2/2008 | Miglioranza | 320/150 |
| 2008/0124616 A1 | 5/2008 | Miglioranza | |

FOREIGN PATENT DOCUMENTS

| | | |
|---|---|---|
| DE | 2455872 A1 | 5/1975 |
| DE | 3617439 A1 | 11/1987 |
| EP | 0645868 A2 | 3/1995 |
| EP | 0902348 A2 | 3/1999 |
| EP | 1050944 A1 | 11/2000 |
| EP | 1257033 | 11/2002 |
| EP | 1257033 A2 | 11/2002 |
| EP | 1317045 A2 | 6/2003 |
| EP | 1333521 | 8/2003 |
| EP | 1557926 A1 | 7/2005 |
| JP | 2003-223938 | 8/2003 |
| JP | 2004362949 | 12/2004 |
| JP | 2006-127920 | 5/2006 |
| WO | 9323905 | 11/1993 |
| WO | 9931752 | 6/1999 |

OTHER PUBLICATIONS

Japanese Office Action and English translation for App. No. 2007-167836—dated Feb. 28, 2012.

European Office Action for App. No. 07 012 165.2—1242—dated Apr. 3, 2012.

* cited by examiner

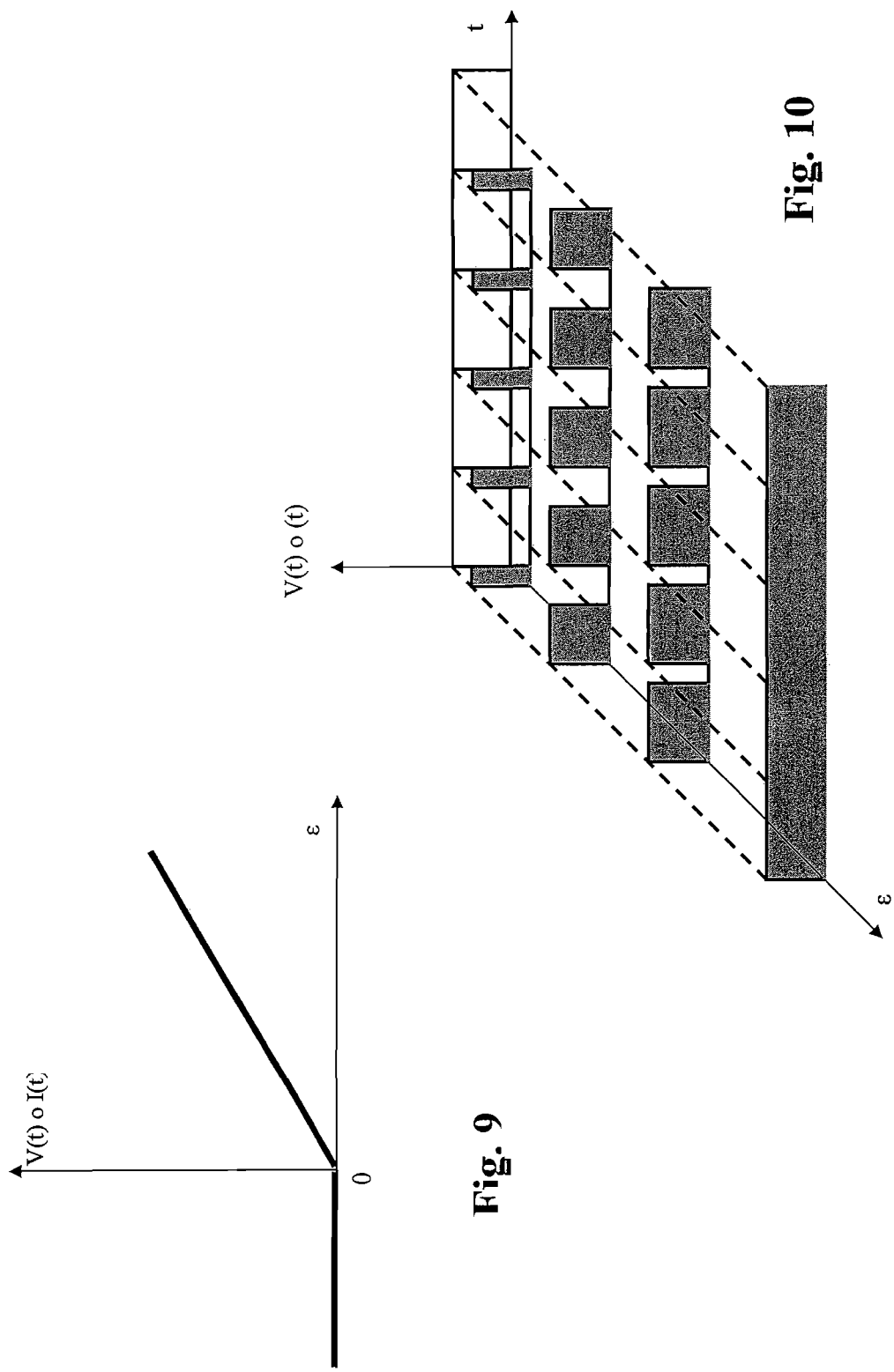

METHOD AND SYSTEM FOR SUPPLYING ELECTRICAL ENERGY FROM A BATTERY POWER SUPPLY UNIT TO A HEATING ELEMENT

FIELD OF INVENTION

The present invention relates to a method and system for temperature-controlled supplying electrical energy from a battery power supply unit to an electronic device, in particular to an electronic device mounted on a bicycle.

BACKGROUND

Electronic devices mounted on bicycles, for example, for controlling the electronic gearshift and/or for acquiring, displaying, and controlling riding parameters and various functions, provide for the use of a power supply unit.

The power supply unit typically consists of one or more batteries typically connected in series, also referred to as a battery pack. The batteries used for such electronic devices are typically of a rechargeable type.

The nominal voltage and the capacity of a battery are correlated by a relationship that changes as the temperature of the battery changes. FIG. 22 shows an example characteristic curve, wherein the progression of the nominal voltage, expressed in V, and the capacity, expressed in mAh, of a battery is shown at temperatures of −20° C., −10° C., 0° C., room temperature, and 60° C.

As can be seen in the characteristic curve of FIG. 22, as the temperature decreases, the voltage and capacity values decrease, namely, the curves move towards the zero point. In certain cold conditions, as can be experienced in the cold seasons by the battery power supply unit of an electronic device, in particular mounted on a bicycle, the battery despite being charged is not therefore able to supply the current required by the load, or to maintain the required voltage. This therefore causes a degradation of the system performance. In order to best optimize the battery, it is therefore advantageous not to use it at low temperatures.

The technical problem at the basis of the present invention is to allow the power supply unit to also be used at low atmospheric temperature.

SUMMARY

In a first aspect thereof, the invention concerns a method for temperature-controlled supplying electrical energy from a battery power supply unit to a bicycle electronic device. The method comprises the steps of:

detecting at least one temperature of the power supply unit, controlling the operative conditions of the battery power supply unit, including checking whether the detected temperature is less than or equal to a lower temperature threshold, and, if the checking step has a positive outcome, supplying electrical energy from the power supply unit to at least one heating element thermally coupled with the power supply unit.

In a second aspect thereof, the invention concerns a power supply system for a bicycle electronic device, comprising a battery power supply unit, at least one sensor of a temperature indicative of the temperature of the power supply unit, at least one heating element thermally associated with the power supply unit, a selectively actuable electrical connection from the power supply unit to the heating element, and a controller that checks the operative conditions of the system and, if the check has a positive outcome, actuates the electrical connection to supply electrical energy from the power supply unit to the heating element, wherein the operative conditions include whether the detected temperature is less than or equal to a lower temperature threshold.

In a third aspect thereof, the invention concerns a bicycle electronic device for the described system, comprising a connector for receiving electrical energy from a power supply unit comprising at least one heating element, and a controller that receives in input a signal indicative of a temperature of the power supply unit and provides a signal for switching part of the electrical energy of the power supply unit towards the heating element when the detected temperature is less than or equal to a lower temperature threshold.

BRIEF DESCRIPTION OF THE DRAWING(S)

The invention shall now be better described with reference to some embodiments thereof, illustrated namely as a non-limiting example in the attached drawings, wherein:

FIGS. 9 and 10 show two preferred embodiments of power supply signals of a heater of the invention;

DETAILED DESCRIPTION OF THE PREFERRED EMBODIMENT(S)

Figure 1:
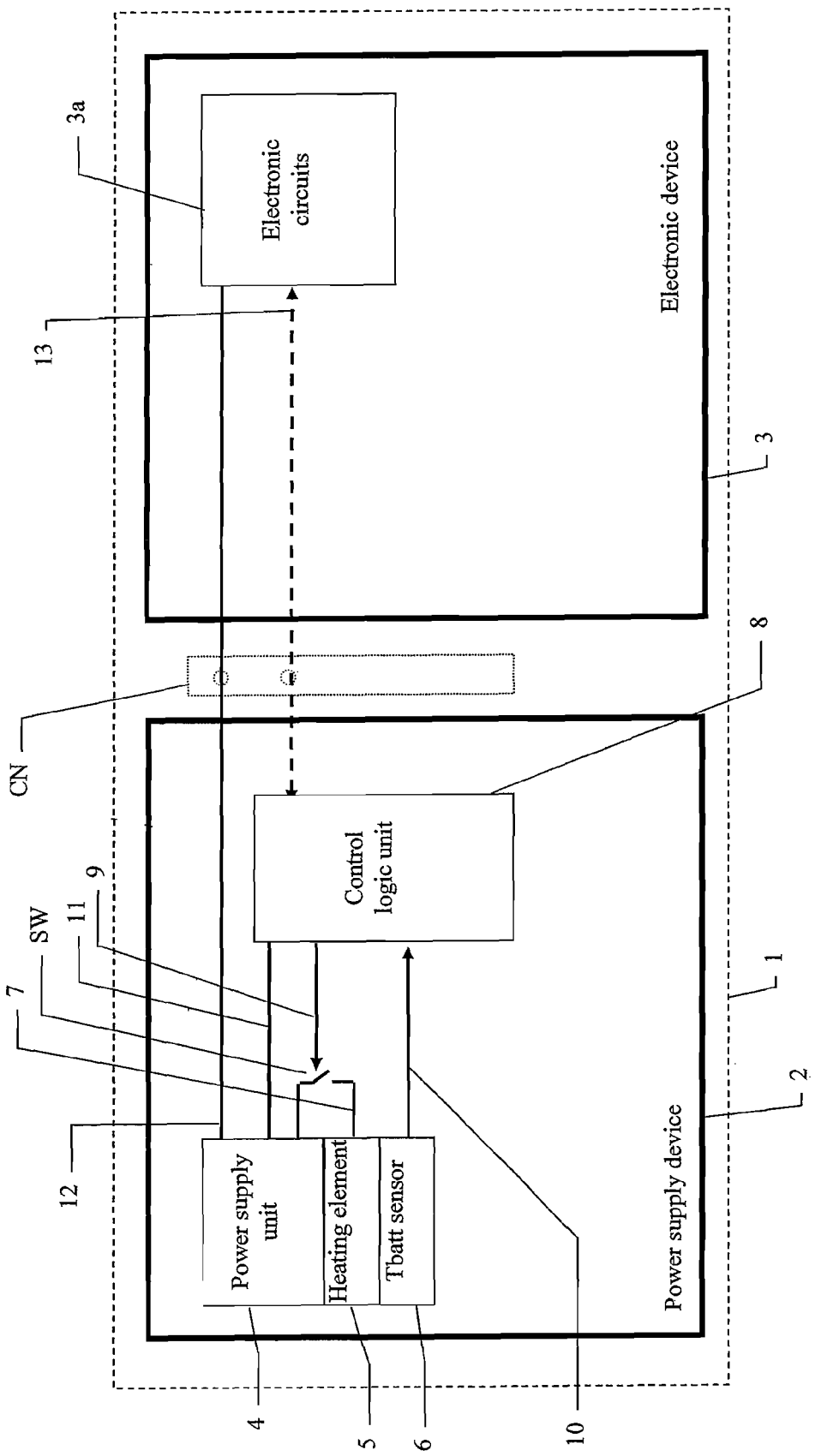
FIG. 1 is a block diagram of a first embodiment of the system of the invention.

In a first aspect thereof, the invention concerns a method for temperature-controlled supplying electrical energy from a battery power supply unit to a bicycle electronic device. The method comprises the steps of:
- detecting at least one temperature of the power supply unit,
- controlling the operative conditions of the battery power supply unit, including checking whether the detected temperature is less than or equal to a lower temperature threshold,
- and, if the checking step has a positive outcome,
- supplying electrical energy from the power supply unit to at least one heating element thermally coupled with the power supply unit.

Through the self-heating of the power supply unit, its temperature is raised to temperature values at which the performance of the power supply unit is satisfactory.

The value of the lower temperature threshold is advantageously selected as that which ensures a capacity of the power supply unit of at least 5%, and preferably 40%, of the maximum nominal capacity of the power supply unit.

In the case of the use of a lithium-ion battery with polymeric electrolyte, the value of Tlow is advantageously selected as equal to −4° C.

Advantageously, the checking step can comprise checking whether the detected temperature is lower than an upper temperature threshold. Through the provision of the double threshold it is possible to obtain a more continuative heating of the power supply unit, avoiding in particular a too-high frequency of switching on and off the element intended for heating, and the risk of instability of the system should the temperature of the power supply unit quickly change about the lower temperature threshold.

The value of the upper temperature threshold is selected so as to obtain a good compromise between the performance of the power supply unit and its charge consumption, and preferably is selected as that which ensures a capacity of the power supply unit of at least 75% of the maximum nominal capacity of the power supply unit.

More preferably, the upper temperature threshold is 4° C. In an embodiment, the electrical energy from the power supply unit to the at least one heating element is supplied as a function of a difference between the lower temperature threshold and a temperature proportional to the detected temperature, in this way implementing a closed loop feedback control.

The function is preferably a function of the proportional, integrative, and/or derivative type.

The step of detecting at least one temperature can comprise detecting the temperature of each of a plurality of batteries of the battery power supply unit, for example, taking the average or the minimum temperature as a reference for the check.

Alternatively or additionally, the checking step can comprise checking whether a difference between the lower temperature threshold and the detected temperature is less than or equal to a maximum temperature difference.

The maximum temperature difference between the lower temperature threshold and the detected temperature is selected as that beyond which the power supply unit is unable to self-heat sufficiently, i.e., until it reaches or exceeds the lower temperature threshold value, at the same time preserving an adequate residual charge for the operation of the electronic device for an adequate time.

Preferably, $\Delta T_{max}=15°$ C., in particular for lithium-ion batteries with polymeric electrolyte.

In order to maximize the simplicity of the checking, the maximum temperature difference can be selected at a constant value, selected experimentally and based upon the type of power supply unit and heating element used, for example, at 15° C.

Alternatively it is possible to take the actual possibility of the power supply unit self-heating into greater account, selecting the maximum temperature difference as a non-decreasing function of the residual charge of the power supply unit.

To the same purpose, the method according to the invention can comprise the step of detecting the residual charge of the power supply unit, and the checking step can comprise checking whether the residual charge is greater than a minimum residual charge.

In an embodiment, the minimum residual charge is a constant percentage value, for example, 75% of the maximum charge of the power supply unit.

The constant percentage value can, for example, be selected so as to ensure the heating of the power supply unit and acceptable performance of the electronic device for at least a few hours, for example, for at least three hours, when the difference between the lower temperature threshold and the detected temperature is equal to the maximum temperature difference beyond which the power supply unit is unable to self-heat to reach or exceed the lower temperature threshold value.

To take the actual possibility of the power supply unit self-heating and providing acceptable performance into greater account, the minimum residual charge can be a non-decreasing function of the temperature difference.

Preferably, the minimum residual charge is an increasing function of the temperature difference in the temperature difference range comprised between 0° C. and a maximum temperature difference, is equal to a residual reserve charge for a temperature difference equal to 0° C., and is equal to a maximum charge (100%) of the power supply unit for temperature differences greater than or equal to the maximum temperature difference.

In other words the self-heating according to the invention is only carried out when the power supply unit is totally charged in case of very high temperature differences, is never carried out when the power supply unit is almost empty, in order to safeguard the operation of the electronic device and, between such extreme conditions, a compromise is reached between the need to preserve energy of the power supply unit for the electronic device and the need to heat the power supply unit.

In a particularly simple embodiment, the increasing function of the temperature difference in the temperature difference range comprised between 0° C. and a maximum temperature difference is linear.

The minimum residual charge can also be selected as equal to the residual reserve charge for temperature differences less than 0° C.

The residual reserve charge is preferably selected as equal to 30% of the maximum charge of the power supply unit.

Preferably, in the temperature difference between the lower temperature threshold and the detected temperature used in combination with the check upon the residual charge in the various aforementioned embodiments, atmospheric temperature is used as the detected temperature.

Advantageously, the checking step comprises checking in advance whether the electronic device is active.

Active system means that the system is not on stand-by, a status into which the system goes when, for example, the bicycle is stationary for a long time. The system can be active for a minimum time following the activation of buttons, sensors, battery recharging, etc. On the other hand, the system is always active when the bicycle moves or is controlled or, in any case, when its electronic part is used. Lastly, the system can be active for a certain period when periodic awakening occurs, which is necessary to control slowly variable magnitudes that need to be taken into account even with the system on stand-by.

In case the power supply unit comprises a plurality of batteries, preferably the part of energy from the power supply unit is supplied to a plurality of heating elements thermally coupled with each battery. In this way, it is possible to individually control the temperature of each battery, improving their performance.

The method outlined above can further comprise a step of supplying electrical energy to the electronic device.

Advantageously, it can be provided that the step of supplying electrical energy to the electronic device only occurs when the detected temperature is higher than the lower temperature threshold. In this way, the electrical energy of the power supply unit, which is operating under non-optimal conditions, is dedicated exclusively to self-heating.

In a second aspect thereof, the invention concerns a power supply system for a bicycle electronic device, comprising
- a battery power supply unit,
- at least one sensor of a temperature indicative of the temperature of the power supply unit,
- at least one heating element thermally associated with the power supply unit,
- a selectively actuable electrical connection from the power supply unit to the heating element, and
- a controller that checks the operative conditions of the system and, if the check has a positive outcome, actuates the electrical connection to supply electrical energy from the power supply unit to the heating element, wherein the operative conditions include whether the detected temperature is less than or equal to a lower temperature threshold.

The bicycle electronic device is typically provided for controlling an electronic gearshift and/or for acquiring, displaying, and controlling bicycle riding parameters and other functions and can be external to the system or be part thereof.

As to the lower temperature threshold, what has been described above with reference to the method of the invention is still valid.

The operative conditions can further include whether the detected temperature is lower than an upper temperature threshold.

As to the upper temperature threshold, what has been described above with reference to the method of the invention is still valid.

Preferably, the controller actuates the electrical connection through a power regulator selected from the group consisting of relays and solid-state switches.

In an embodiment, the controller drives the power regulator to supply a heat power to the power supply unit that is a function of a difference between the lower temperature threshold and a temperature proportional to the detected temperature.

The function is preferably selected from the group consisting of a proportional function, an integrative function, a derivative function, and combinations thereof.

More specifically, the heating element is of the resistive type, and the controller comprises a multiplier of the output signal of the at least one temperature sensor, a subtractor to subtract the output of the multiplier from the lower temperature threshold and for obtaining an error signal, and a P.I.D. (proportional-integral-derivative) type power regulator block acting upon the error signal to output a driving signal, preferably a current or voltage driving signal, for the power regulator.

In an embodiment, the P.I.D. power regulator block causes a voltage value at the ends of the heating element, or a current value through the heating element, which increases as the error signal increases.

In an embodiment, the P.I.D. power regulator block causes a modulated voltage at the ends of the heating element, or a modulated current through the heating element, the duty cycle of which increases as the error signal increases.

Preferably, the at least one temperature sensor comprises at least one temperature sensor thermally coupled with the power supply unit.

When the power supply unit comprises at least two batteries, preferably at least one temperature sensor is thermally associated with each battery, so as to better control the actual temperature of each battery. The temperature used in the method according to one of the embodiments described above can, for example, be the minimum or the average among the detected temperatures.

Preferably, the at least one temperature sensor comprises a thermistor, more preferably a negative temperature coefficient thermistor or NTC.

The operative conditions checked by the controller can further include whether a difference between the lower temperature threshold and the detected temperature is less than or equal to a maximum temperature difference.

Similarly to what has been described with reference to the method of the invention, the maximum temperature difference can be a constant value, for example, equal to 15° C., or a non-decreasing function of the residual charge of the power supply unit, detected by a respective sensor.

When the system comprises at least one sensor of residual charge of the power supply unit, the operative conditions checked by the controller can include whether the residual charge is greater than a minimum residual charge, as to which what has been discussed above with reference to the method of the invention is still valid.

In this case, the system preferably comprises an atmospheric temperature sensor to provide the detected temperature used for evaluating the temperature difference.

Similarly to what has been described with reference to the method of the invention, the operative conditions can include whether the electronic device is active. For this purpose, the system preferably comprises an auxiliary connection between the controller and the electronic device.

Preferably, the heating element is of the resistive type, more preferably, the heating element comprises at least one resistive sheet applied to at least one battery of the power supply unit, and even more preferably, the at least one resistive sheet is interposed between two adjacent batteries of the power supply unit.

When a temperature sensor and a heating element for each battery of the power supply unit are provided, the method of the invention can advantageously be carried out individually for each battery.

The components of the system can be housed in a single casing, which can be fixed to the frame of the bicycle.

In other embodiments, the power supply unit is housed in a first casing and the electronic device is housed in a second casing, the first and the second casing being mechanically and electrically removably connectable. In this way it is possible to detach the power supply unit from the bicycle, to recharge it and/or to replace it with a charged one.

The controller can be housed in the first casing. In this case, the bicycle electronic device can be standard, in particular external to the system. The system is therefore made up of just the power supply device and is easy to install as an upgrade of existing bicycle electronic devices.

Alternatively, the controller is housed in the second casing. The power supply device is thus more cost-effective, an advantageous aspect when two or more interchangeable removable rechargeable power supply devices are provided.

A power regulator for the selective actuation of the electrical connection from the power supply unit to the heater can be housed in the first casing. This is advantageous when the power regulator is of the solid-state type, for example of the MOSFET (metal-oxide-semiconductor field-effect transistor) type, since it undergoes heating caused by switching losses during its actuation and deactuation. The heat produced by such losses is advantageously exploited to heat the power supply unit, in addition to the heating produced by the heating element.

Alternatively, the power regulator for the selective actuation of the electrical connection can be housed in the second casing, for example, to further reduce the costs of two or more interchangeable power supply devices.

The selectively actuable electrical connection can be shunted from the electrical connection from the power supply unit to the electronic device. Such a configuration is advantageous when the power supply device and the electronic device can be removably connected through a pair of connectors, since the number of contacts is particularly small.

Preferably, a sensor of residual charge of the power supply unit is housed in the first casing. Since it is associated with the power supply unit, the charge sensor can advantageously exploit the calculation of the integral over time of the current supplied by the power supply unit. Alternatively, the charge sensor could be housed in the second casing.

The possible atmospheric temperature sensor is preferably housed in the second casing, but it could also be housed in the first casing or at any other location of the bicycle.

Typically, the battery power supply unit is of the rechargeable type.

In a third aspect thereof, the invention concerns a bicycle electronic device for the described system, comprising a connector for receiving electrical energy from a power supply unit comprising at least one heating element, and a controller that receives in input a signal indicative of a temperature of the power supply unit and provides a signal for switching part of the electrical energy of the power supply unit towards the heating element when the detected temperature is less than or equal to a lower temperature threshold.

Preferably, the device further comprises a power regulator for regulating the switching of the part of electrical energy, driven by the signal provided by the controller.

Preferably, the device further comprises a temperature sensor, the output of which is supplied to the controller.

DETAILED DESCRIPTION

The block diagram of a first embodiment of the system 1 of the invention is shown in FIG. 1.

In such an embodiment two functional blocks are identified, namely a power supply device 2 and a bicycle electronic device 3, for example, for controlling an electronic gearshift and/or for acquiring, displaying, and controlling bicycle riding parameters and other functions.

For the sake of simplicity, only the electronic circuits of the electronic device 3 are schematically illustrated, indicated with 3a. It should be understood that such an electronic device 3 can in practice further comprise user interface devices, as well as the driving units of the actuators of the derailleurs and, typically, it shall be connected to other devices as, for example, sensors, an inclinometer, and the like.

The bicycle electronic device 3 and the power supply device 2 can be housed in separate casings, indicated hereafter with the same reference numerals 2 and 3, be mechanically and electrically removably connectable, for example, through the interposition of a pair of multipolar connectors CN. Alternatively, the bicycle electronic device 3 and the power supply device 2 can be housed inside a same casing, indicated hereafter with the same reference numeral 1.

The power supply device 2 comprises a power supply unit 4, a heating element 5 thermally coupled with the power supply unit 4, a temperature sensor 6 thermally coupled with the power supply unit 4 to detect its temperature Tbatt, and a control logic unit or controller 8.

In a practical embodiment, the power supply unit 4 could consist of many battery elements, for example, connected in series to obtain an adequate voltage for supplying power to the bicycle electronic device 3. The power supply unit 4 is of the rechargeable type, for example, of the lithium-ion type with polymeric electrolyte.

The heating element 5 preferably consists of a resistive sheet placed in contact with the outer surface of the power supply unit 4. The heating element 5 is electrically connected to the power supply unit 4 through an electrical connection 7 in which a power regulator SW is arranged, driven by the controller 8 as schematically indicated by the arrow or data connection 9. The power regulator SW can also be a simple ON/OFF switch.

The power regulator SW preferably consists of a MOSFET, but in different embodiments such a power regulator could, for example, consist of a transistor or even a relay.

The temperature sensor 6 is arranged in proximity to the power supply unit 4, also preferably in contact with the outer surface of the power supply unit 4, and it preferably consists of a passive element like an NTC (Negative Temperature Coefficient) thermistor. In different embodiments such a sensor could be of a different type, for example, a PTC (Positive Temperature Coefficient) thermistor, an active (analogue or digital) sensor, etc. The output of the temperature sensor 6 is provided in input to the controller 8, as indicated by the arrow or data connection 10.

The power supply unit 4 supplies power to the controller 8 through a power supply line 11 and supplies power to the electronic device 3, in particular to its electronic circuits 3a, through a power supply line 12. It should be understood that in addition to the connections shown there is also a ground connection, not shown for the sake of simplicity.

An auxiliary communication line 13 between the controller 8 and the electronic device 3 can be further provided.

It should be noted that in the case of the embodiment of FIG. 1, wherein the controller 8 is part of the power supply device 2, the bicycle electronic device 3 can be standard and, in particular, external to the system 1. The system 1 is thus made up of the power supply device 2 and is easy to install as an upgrade to existing bicycle electronic devices 3.

The operation of the system of FIG. 1 shall be described below with reference to FIGS. 5-8.

Figure 2:
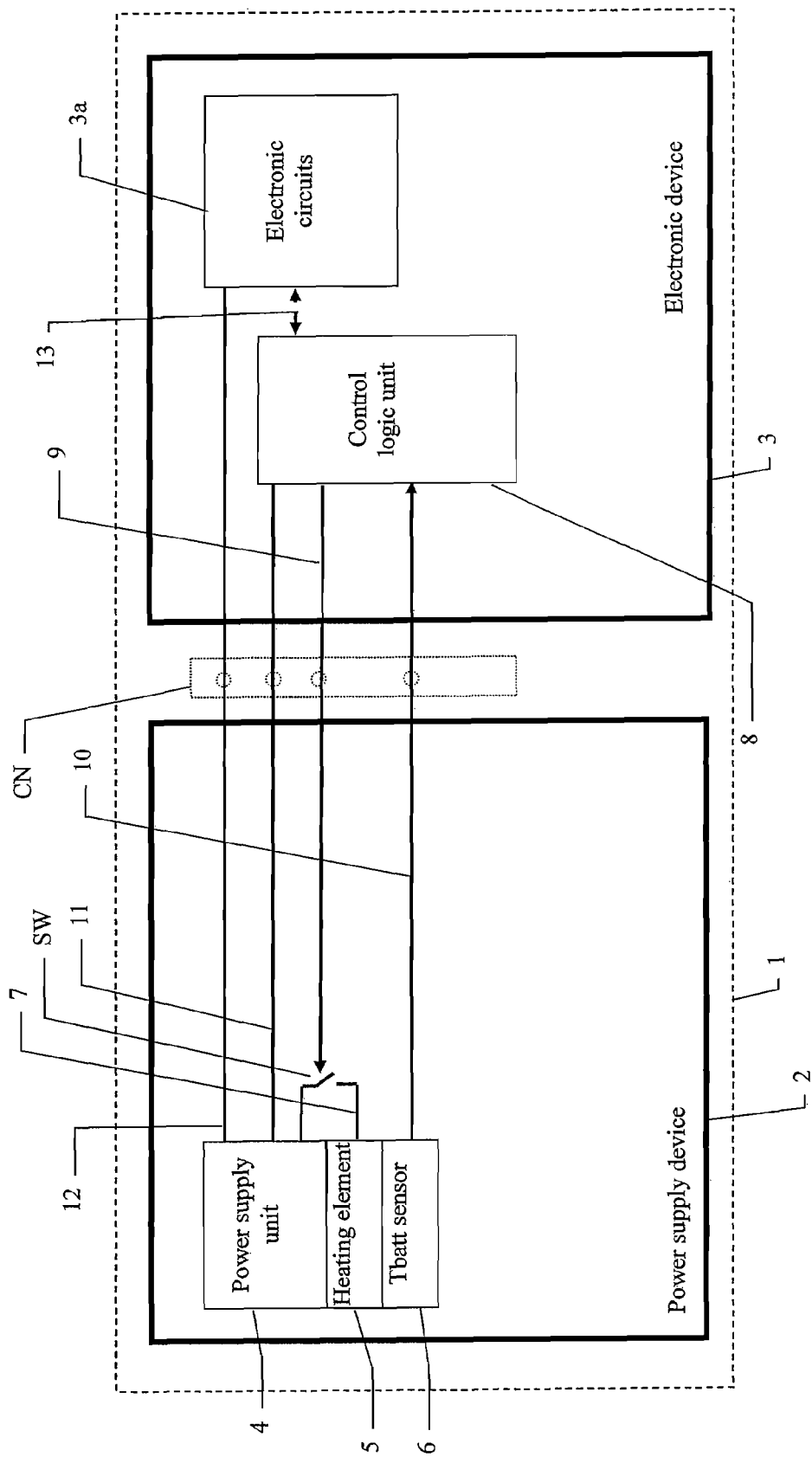
FIG. 2 is a block diagram of a second embodiment of the system of the invention.

A second embodiment of the system according to the invention is illustrated in FIG. 2. The embodiment of FIG. 2 differs from the embodiment of FIG. 1 in that the controller 8 is part of the electronic device 3. The controller 8 can in this case advantageously consist of an electronic circuit mounted on the same printed circuit where the electronic circuits 3a of the electronic device 3 are arranged.

Alternatively, the controller 8 can be embodied in a microprocessor of the electronic device 3, intended for other bicycle control functions, for example, the management of an automatic or semiautomatic gearshift.

By providing that the controller 8 is part of the electronic device 3, the power supply device 2 is more cost-effective, an advantageous aspect when two or more interchangeable removable power supply devices 2 of the rechargeable type are provided. To provide that the power regulator SW remains part of the power supply device 2 can be advantageous when the power regulator SW is a solid-state device, for example of the MOSFET type since, during its actuation and deactuation, it undergoes heating caused by switching losses. The heat produced by such losses is advantageously exploited to heat the power supply unit 4, in addition to the heating produced by the heating element 5, as further described hereafter.

Figure 3:
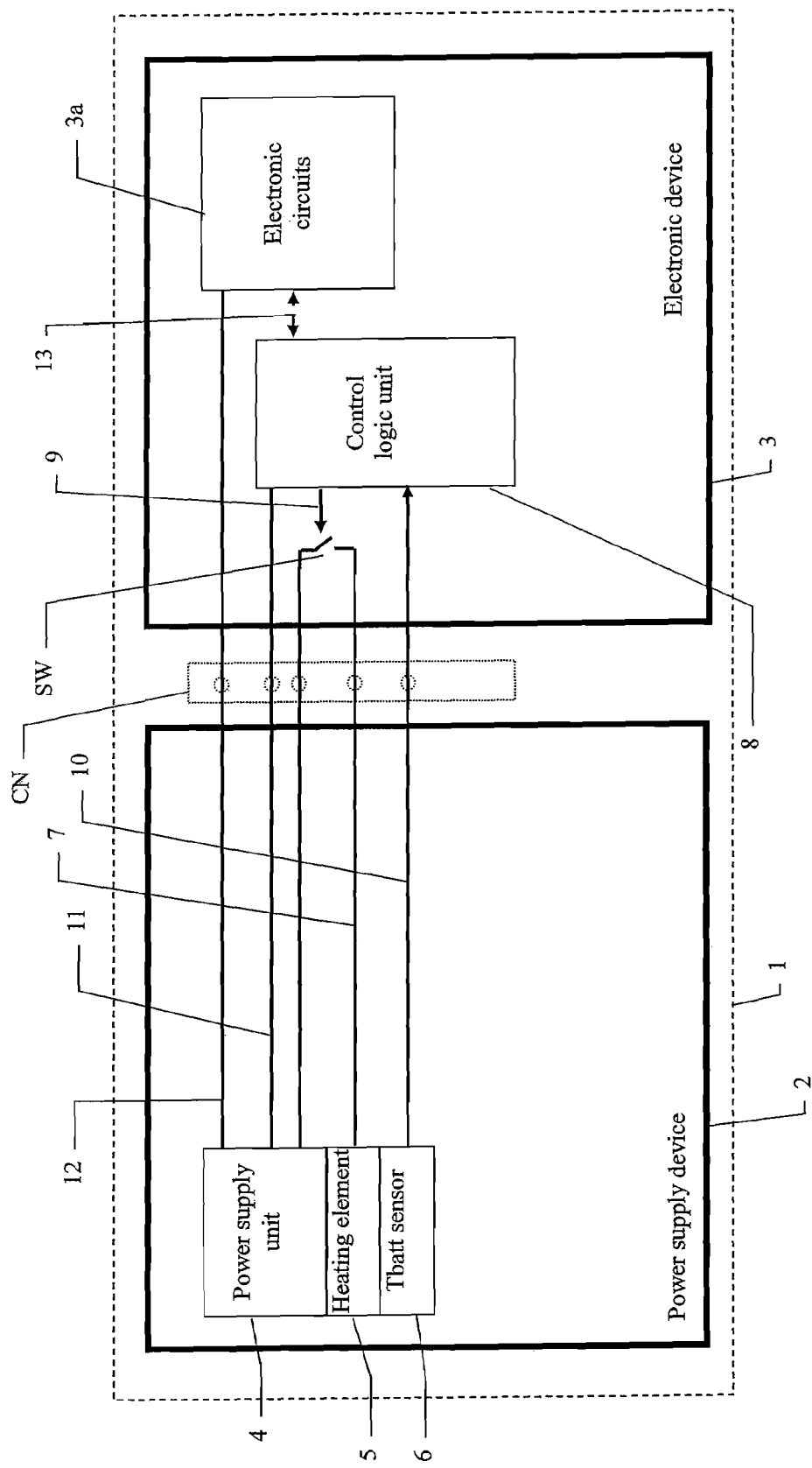
FIG. 3 is a block diagram of a third embodiment of the system of the invention.

It is, however, possible, for example, in order to further reduce the costs of two or more interchangeable power supply devices 4, to provide for the power regulator SW to be part of the electronic device 3, as illustrated in the third embodiment of the system according to the invention shown in FIG. 3. The embodiment of FIG. 3 is otherwise the same as the embodiment of FIG. 2.

Figure 4:
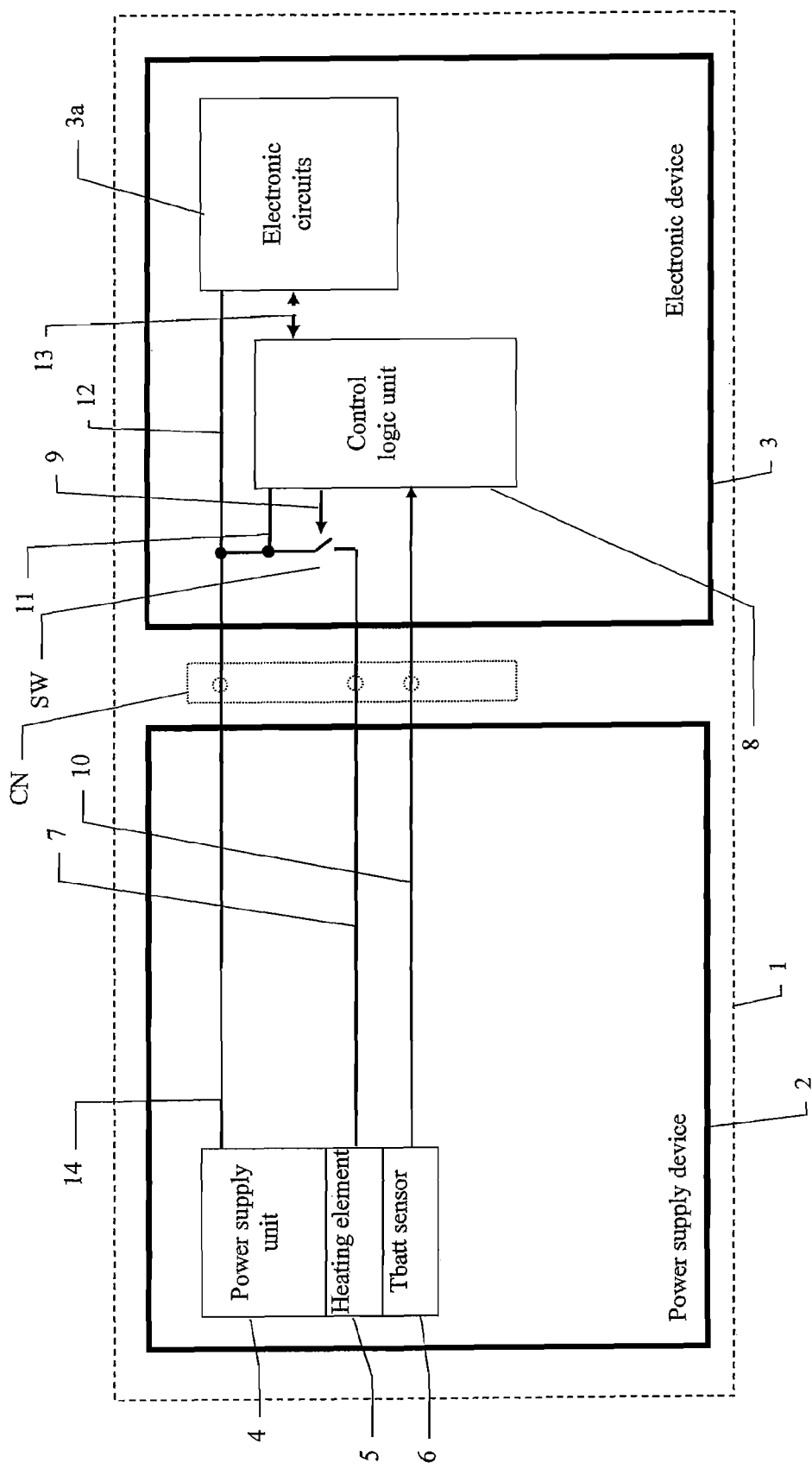
FIG. 4 is a block diagram of a fourth embodiment of the system of the invention.

A fourth embodiment of the system according to the invention is illustrated in FIG. 4.

The embodiment of FIG. 4 differs from the embodiment of FIG. 3 in that the power supply lines 11, 12 of the controller 8 and of the electronic circuits 3a of the electronic device 3, as well as the electrical connection 7 of the heating element 5, provided with the power regulator SW, consist, on the side of the power supply unit 4, of a single power supply line 14. Such a configuration is advantageous when the power supply device 2 and the electronic device 3 are removably connectable through the pair of connectors CN, since the number of contacts is particularly small.

A first embodiment of the method according to the invention shall be described with reference to the system of one of the embodiments described above.

According to such a first embodiment of the method according to the invention, the following parameter is used Tlow=lower temperature threshold, a value selected experimentally and based upon the type of battery power supply unit 4 used; this lower temperature threshold is the temperature at which or above which one wishes to bring or maintain the temperature of the power supply unit 4 so that it operates satisfactorily.

The value of the lower temperature threshold Tlow is advantageously selected as that which ensures a capacity of the power supply unit 4 of at least 5%, and preferably 40%, of the maximum nominal capacity of the power supply unit 4.

The value of Tlow is stored in the controller 8 and can be settable through the user interface of the electronic device 3.

In the case of use of a lithium-ion battery with polymeric electrolyte, the value of Tlow is advantageously selected as equal to −4° C.

In the first embodiment of the method according to the invention it is also possible to use the parameter, stored in the controller 8 and possibly settable through the interface of the electronic device 3:

$\Delta T_{max}$=maximum temperature difference, selected experimentally and based upon the type of power supply unit 4 and of the heating element 5 used, above which it is considered that the power supply unit 4 is unable to self-heat sufficiently, i.e., up to at least the lower temperature threshold value Tlow, or is unable to self-heat and, at the same time, preserving an adequate residual charge for the operation of the electronic device 3 for an adequate time; for example, $\Delta T_{max}$=15° C. for lithium-ion batteries with polymeric electrolyte.

Figure 5:
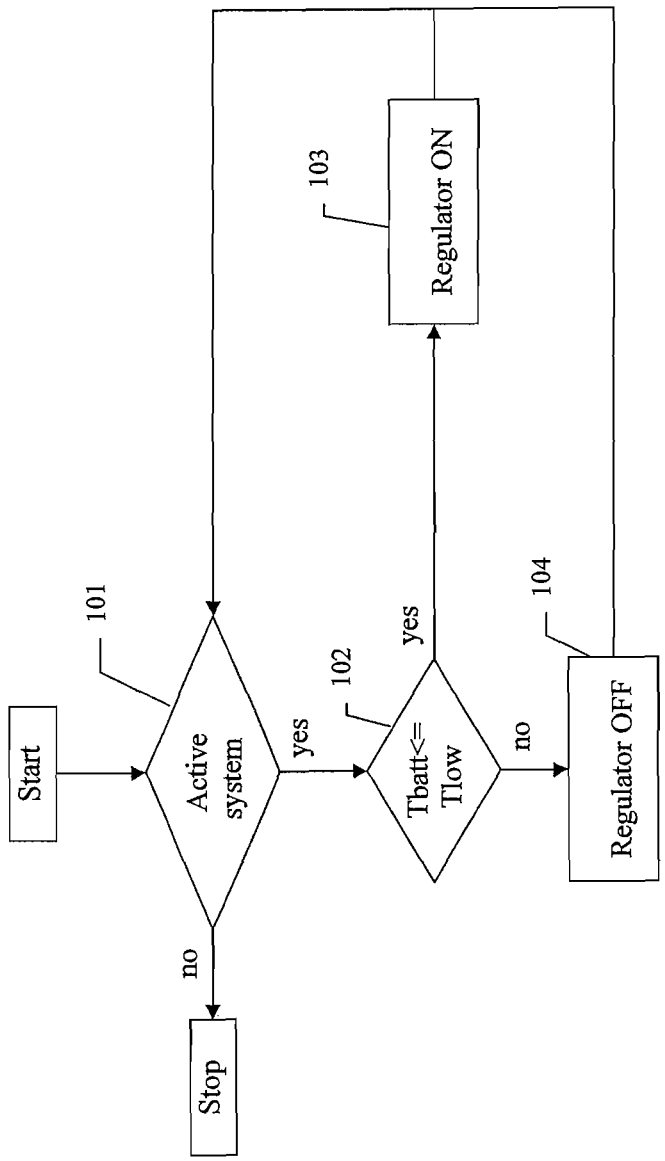
FIG. 5 is a block diagram of a first embodiment of the method of the invention.

With reference to FIG. 5, in an optional block 101 the controller 8 checks whether the system is active through the signals coming from the auxiliary communication line 13.

Active system means that the system is not on stand-by, a status into which the system goes when, for example, the bicycle is stationary for a long time. The system can be active for a minimum time following the activation of buttons, sensors, recharging of the power supply unit, etc. On the other hand, the system is always active when the bicycle is moving or is controlled or in any case when its electronic part is used. Lastly, the system can be active for a certain period when periodic awakening occurs, which is necessary for checking slowly variable magnitudes that need to be taken into account even with the system on stand-by.

If the check of whether the system is active (block 101) gives a positive outcome, in block 102 the controller 8 detects the temperature value Tbatt of the battery 4 through the temperature sensor 6.

If the detected value Tbatt is less than or equal to the preselected lower temperature threshold value Tlow, i.e., Tbatt<=Tlow, the controller 8, in block 103, actuates the heating element 5 driving the power regulator SW, of the ON/OFF switch type, to the closed position, through the line 9. Electrical energy is therefore supplied from the power supply unit 4 to the heating element 5. The power supply unit 4, therefore, self-heats.

If, on the other hand, the check of block 102 has a negative outcome, i.e., if the detected value Tbatt is higher than the preselected lower limit temperature value Tlow, i.e., T>Tlow, one proceeds to block 104 wherein the control logic unit 8 deactuates the heating element 5 driving the power regulator or ON/OFF switch SW to the open position.

The self-heating carried out according to this embodiment therefore provides a temperature checking carried out on one threshold Tlow.

It should be noted that the optional check 101 of whether the system is active allows subsequent checks and, above all, the self-heating of the power supply unit 4 to be prevented from being carried out with the system on stand-by, when it would be neither necessary to supply energy from the battery 4 to the electronic device 3 nor to heat it up.

In a second embodiment of the method according to the invention, besides the parameter Tlow and possibly the parameter $\Delta T$ quoted above, the following parameter is used:

Thigh=upper temperature threshold, a value selected experimentally, based upon the type of battery power supply unit 4 used, as well as upon the power of the heater 5; this upper temperature threshold is the temperature at which or above which one wishes to interrupt the heating of the power supply unit 4 to obtain a good compromise between the performance of the power supply unit 4 and its charge consumption.

The value of the upper temperature threshold Thigh is advantageously selected as that which still ensures a capacity of the power supply unit 4 of about 75% of the maximum nominal capacity of the power supply unit 4.

In the case of use of a lithium-ion battery with polymeric electrolyte, the value of Thigh is advantageously selected as equal to 4° C. The value of Thigh is stored in the controller 8 and can be settable through the user interface of the electronic device 3.

Figure 6:
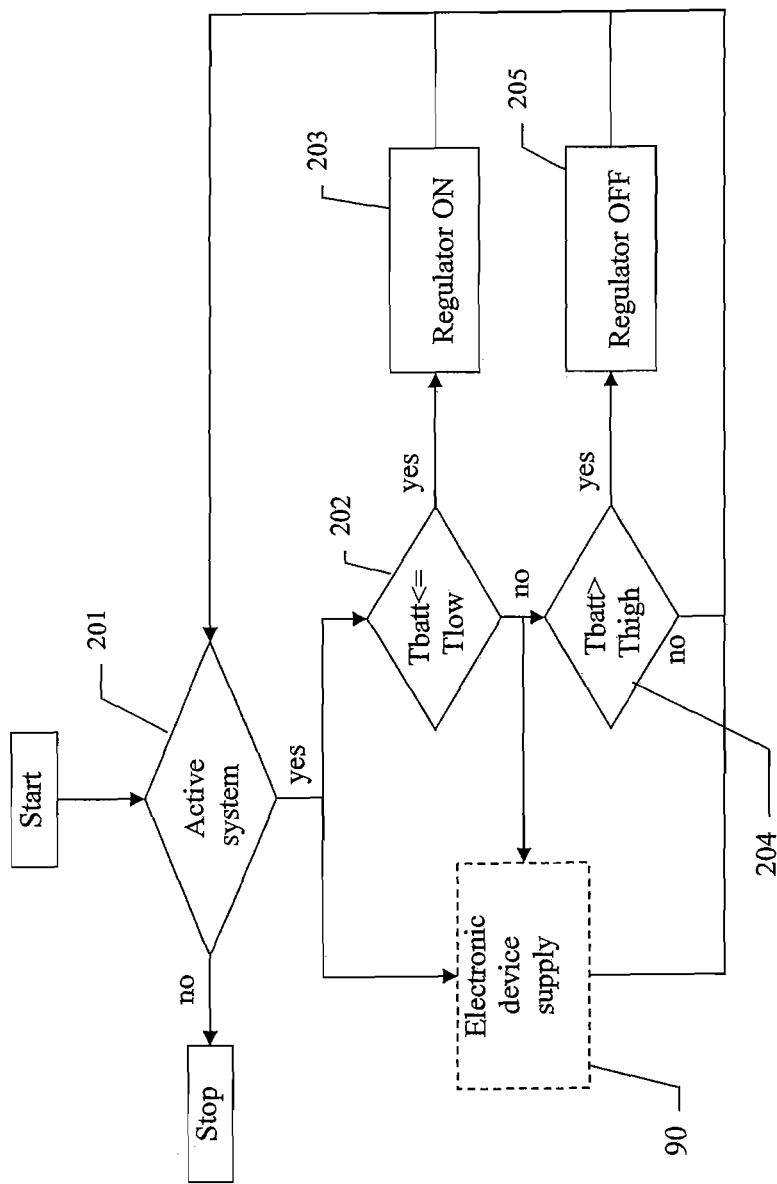
FIG. 6 is a block diagram of a second embodiment of the method of the invention.

With reference to FIG. 6, in the optional block 201 the control logic unit 8 checks whether the system is active, as specified above. In the affirmative case, in block 202 the controller 8 detects the temperature value Tbatt of the power supply unit 4 through the temperature sensor 6.

If the detected value Tbatt is less than or equal to the lower temperature threshold value Tlow, i.e., Tbatt<=Tlow, the controller 8, in block 203, actuates the heating element 5 driving the power regulator SW, of the ON/OFF switch type, to the closed position, through the line 9. Electrical energy is therefore supplied from the power supply unit 4 to the heating element 5. The power supply unit 4, therefore, self-heats.

It should be noted that the power supply unit 4 can simultaneously supply power to the electronic device 3, as indicated by the optional block 90.

It can also be provided that the power supply unit 4 does not supply power to the electronic device 3 (block 90) until the power supply unit 4 itself is at a temperature Tbatt below the lower temperature threshold Tlow. In this way, the electrical energy of the power supply unit 4, which is operating in non-optimal conditions, is dedicated exclusively to self-heating.

If, on the other hand, in block 202 the detected value Tbatt is higher than the preselected lower temperature threshold value Tlow, i.e., Tbatt>Tlow, one proceeds to block 204 where the detected temperature value Tbatt is compared with the upper temperature threshold Thigh. If the detected value Tbatt is higher than the upper temperature threshold Thigh, i.e., Tbatt>Thigh, one proceeds to block 205 wherein the control logic unit 8 deactuates the heating element 5 driving the power regulator or switch SW to the open position.

The self-heating carried out according to this embodiment therefore provides for a temperature control carried out on two thresholds Thigh and Tlow.

The temperature control carried out on two thresholds Thigh and Tlow can be preferable with respect to the control with just one threshold Tlow since it allows the number of actuations and deactuations of the power regulator or switch SW to be reduced, with a reduction of the switching losses, especially when such a power regulator is a solid-state device, for example a MOSFET. Moreover, this control carried out on two thresholds Thigh and Tlow allows possible instability of the system to be avoided should the temperature Tbatt of the power supply unit 4 quickly change about the temperature Tlow, which would involve continuous switching of the switch SW in case of control carried out on just the lower temperature threshold Tlow according to FIG. 5.

In a third embodiment of the method according to the invention the lower temperature threshold is used, indicated here with Tref, possibly in addition to the aforementioned parameter $\Delta T_{max}$, maximum temperature difference.

Figure 7:
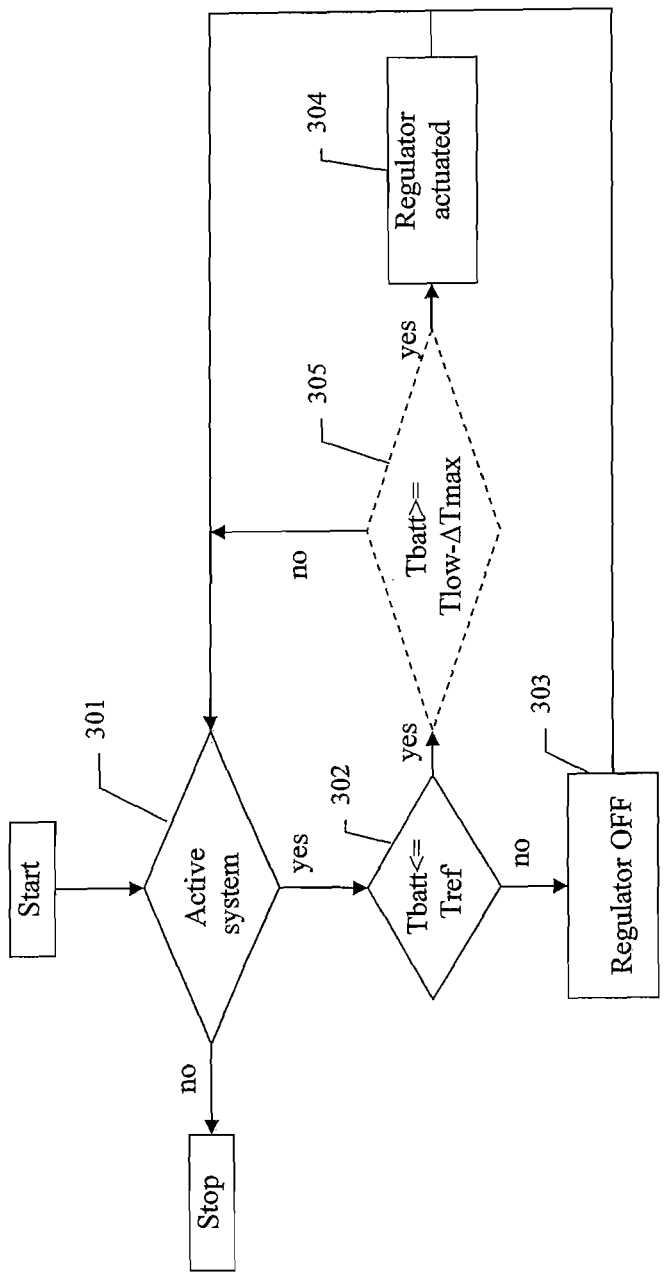
FIG. 7 is a block diagram of a third embodiment of the method of the invention.

With reference to FIG. 7, in the optional block 301 the control logic unit 8 checks whether the system is active, as specified above. In the affirmative case, in block 302 the control unit 8 detects the temperature value Tbatt of the power supply unit 4 through the temperature sensor 6. If the detected value Tbatt is higher than the lower temperature threshold value or reference temperature Tref, the heating element 5 is deactuated—block 303. If the detected value Tbatt is less than or equal to the reference temperature Tref, the further check, block 305, of whether the difference between the temperature Tbatt of the power supply unit 4 and the lower temperature threshold Tlow is not greater than the aforementioned maximum temperature difference $\Delta T_{max}$ can be provided. In other words, in block 305 it is checked whether Tbatt>=Tlow-$\Delta T_{max}$ and the self-heating of the power supply unit 4 is only carried out in the affirmative case, so as not to waste the charge of the power supply unit 4.

Figure 8:
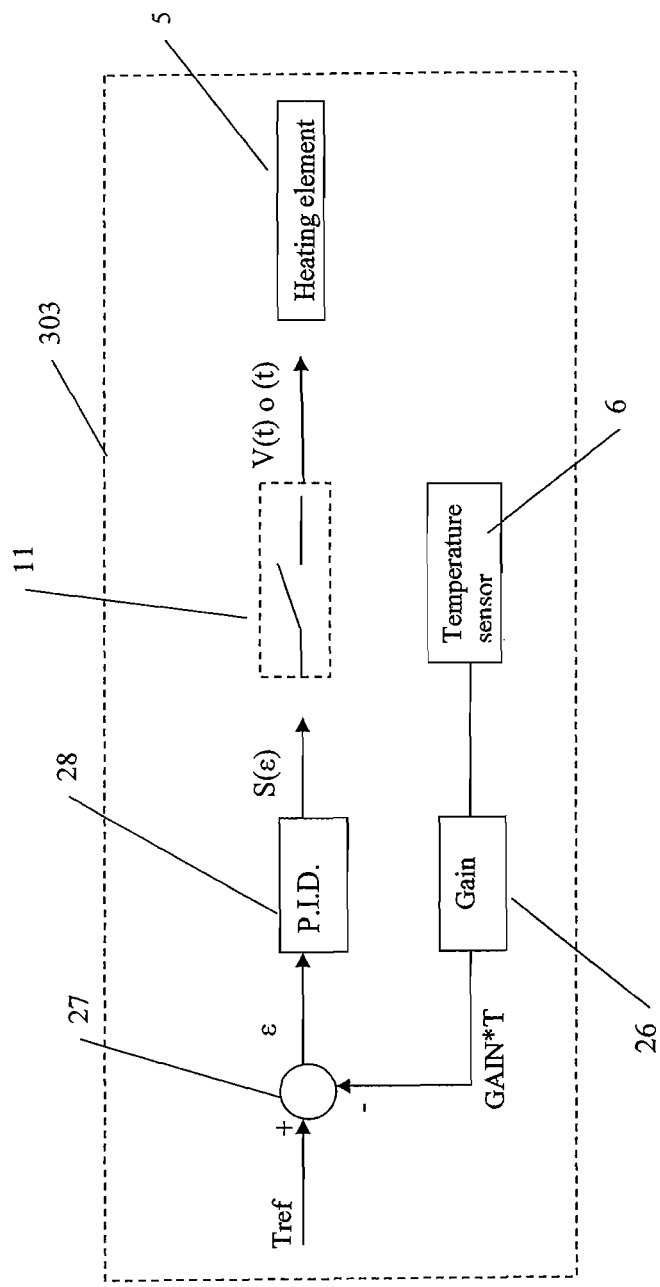
FIG. 8 shows a regulation block of FIG. 7 in greater detail.

If the check of block 302 and the possible check of block 305 give(s) a positive outcome, in block 304 the control unit 8, through the line 9, actuates the heating element 5 through a signal obtained with a closed loop feedback control system shown in FIG. 8.

The driving signal for the heating element 5 is obtained as processing of an error signal suitably filtered by a P.I.D. regulator block.

More specifically, the temperature value T detected by the temperature sensor 6 of the power supply unit 4 is multiplied in a multiplier 26 by a gain value GAIN, which can also be unitary. The output signal from the multiplier, GAIN*T, is subtracted from the value Tref in a subtractor node 27. The output of the subtractor node 27 is indicated as error signal $\epsilon$=Tref−GAIN*T.

The error signal $\epsilon$ is sent to a P.I.D. type regulator block 28, which has a transfer function of the proportional P, derivative D, and/or integrative I type.

The output signal S($\epsilon$) of the regulator block 28 is used to drive the power regulator SW so that the voltage V(t) at the ends of the heating element 5, or the current I(t) flowing through the heating element 5, has the desired progression to provide the desired heat power.

For example, the driving signal S($\epsilon$) can be a signal that causes a voltage value V(t) at the ends of the heating element 5, or a current value I(t) through the heating element 5, when of the resistive type, which increases as the error signal $\epsilon$ increases, as illustrated in the characteristic curve of FIG. 9.

As a further example, the driving signal S($\epsilon$) can be a signal that causes a voltage value V(t) at the ends of the heating element 5, or a current value I(t) through the heating element 5, when of the resistive type, pulse width modulated (PWM signal), wherein the duty cycle of the modulated signal increases as the error signal $\epsilon$ increases, as illustrated in FIG. 10.

It shall be understood that the optional blocks 90 of power supplying the electronic device 3 simultaneously with the self-heating of the power supply unit 4, possibly subordinated to the check of whether the temperature Tbatt of the power supply unit 4 is less than or equal to the lower threshold or reference temperature Tlow, Tref, can also be provided in the first and third embodiment of the method of the invention.

Similarly, the possible check of block 305, of whether the difference between the temperature Tbatt of the power supply unit 4 and the lower temperature threshold Tlow is not greater than the maximum temperature difference $\Delta T_{max}$, can also be provided in the first and second embodiment of the method of the invention.

Figure 11:
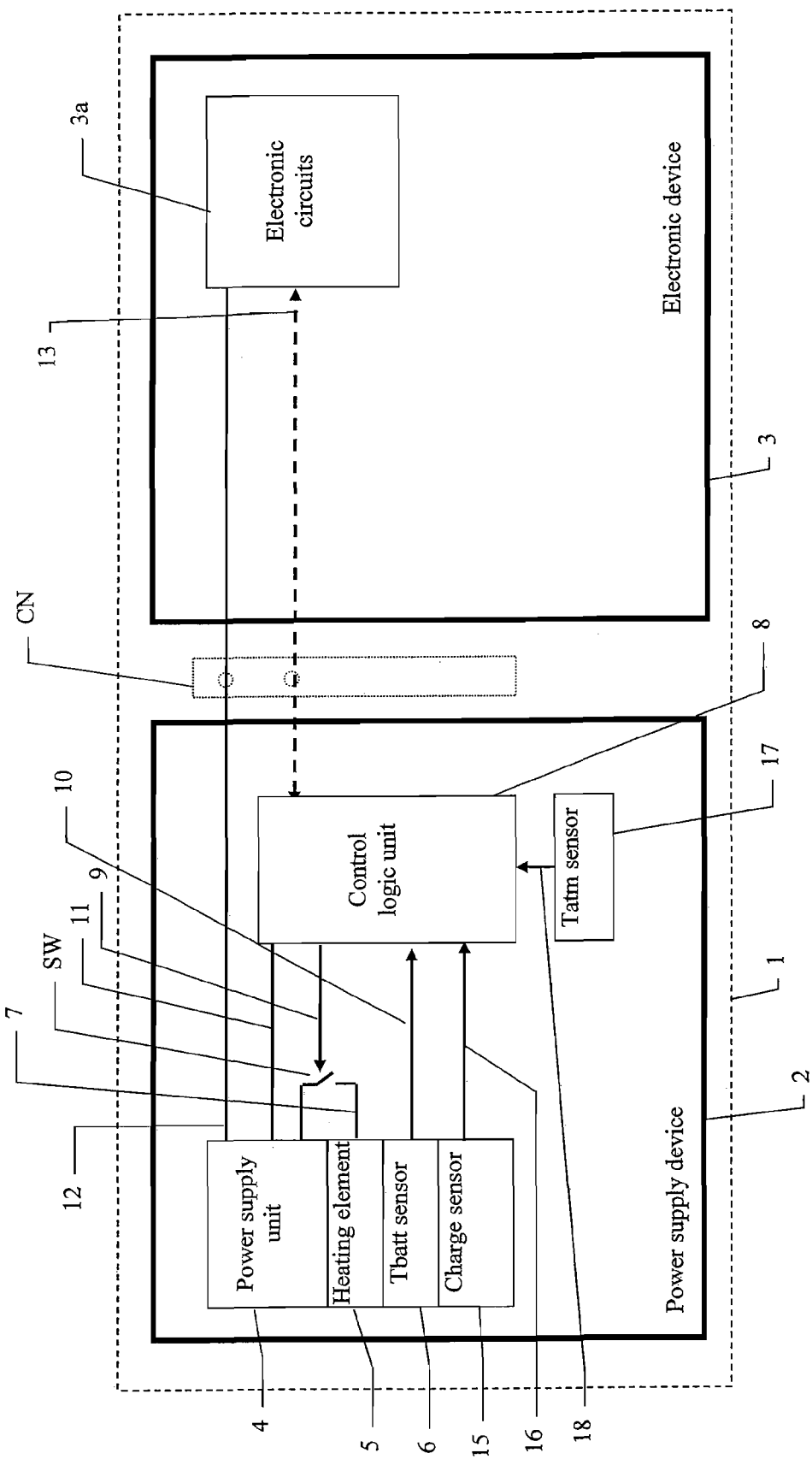
FIG. 11 is a block diagram of a fifth embodiment of the system of the invention.

A fifth embodiment of the system 1 of the invention is illustrated in FIG. 11. Such an embodiment differs from the first embodiment in that the power supply device 2 further comprises a sensor 15 of the residual charge Ch of the power supply unit 4, the output of which is supplied to the controller 8 through a line 16, and a sensor 17 of the atmospheric temperature Tatm, the output of which is supplied to the controller 8 through a line 18.

The charge sensor 15 is preferably based upon the calculation of the integral over time of the current supplied by the power supply unit 4.

The sensor 17 of atmospheric temperature Tatm can be of the same type as the temperature sensor 5 of the power supply unit 4. The sensor 17 of atmospheric temperature Tatm is preferably housed, within the casing 2 of the power supply device 4, at a position preferably far away from the heating element 5. Alternatively, the sensor 17 of atmospheric temperature Tatm can be arranged at any location of the bicycle, outside of the casing 2 of the power supply device 4.

Still alternatively, the sensor 17 of atmospheric temperature Tatm can be absent. Indeed, given that in use the system 1 and, in particular, the power supply device 2 is mounted on the bicycle, the atmospheric temperature Tatm does not substantially differ from the temperature Tbatt of the power supply unit 4 when the power supply unit 4 is switched on and, in any case, the checks carried out on the atmospheric temperature Tatm, as discussed below, can instead be carried out on the initial temperature Tbatt of the power supply unit 4, detected by the sensor 6.

The operation of the system of FIG. 11 shall be described below with reference to FIGS. 15-20.

Figure 12:
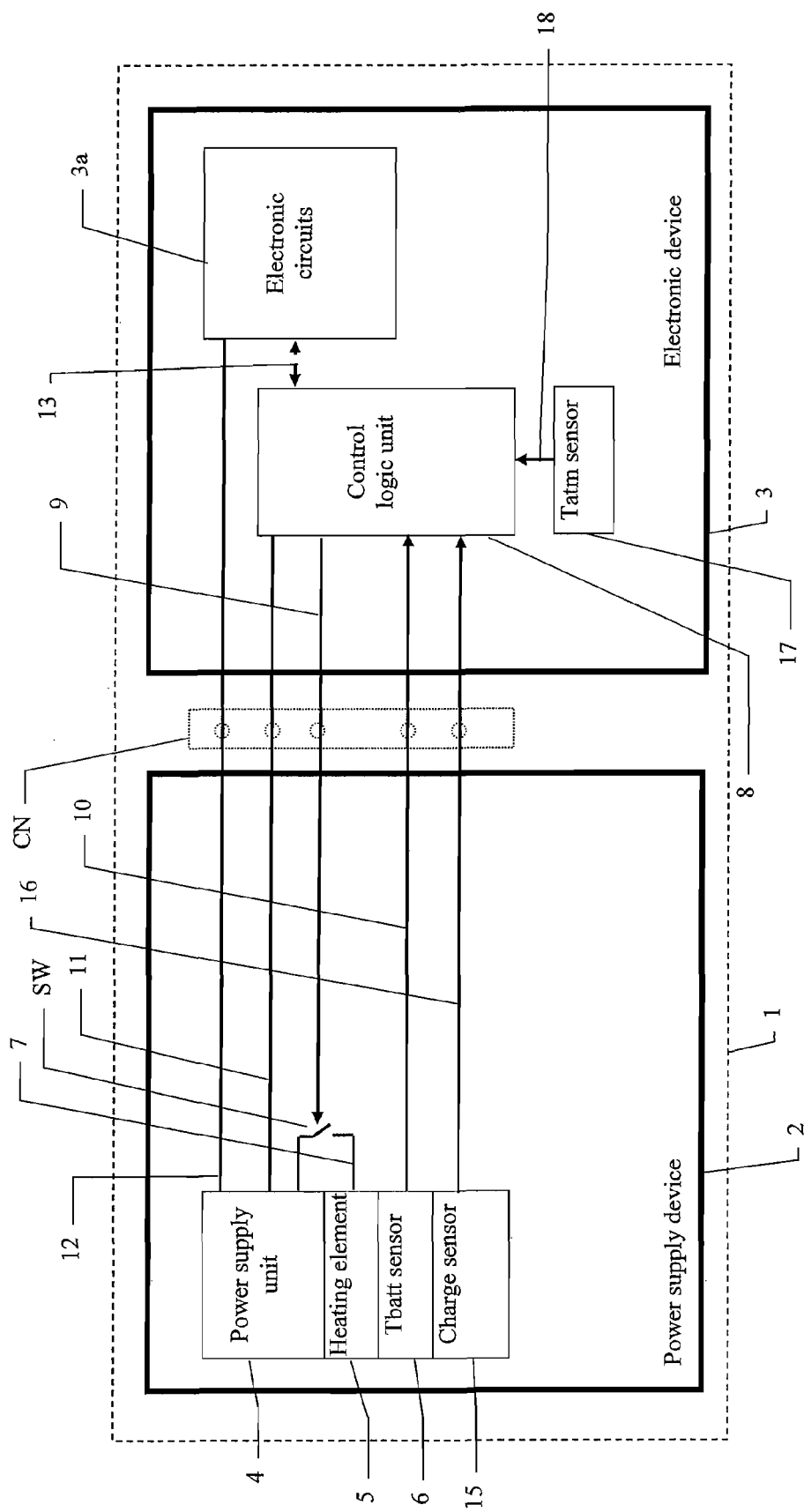
FIG. 12 is a block diagram of a sixth embodiment of the system of the invention.

A sixth embodiment of the system according to the invention is illustrated in FIG. 12. The embodiment of FIG. 12 differs from the embodiment of FIG. 11 in that the controller 8 and the possible sensor 15 of the atmospheric temperature Tatm are part of the electronic device 3. Similar to the embodiments of FIGS. 2-4, the controller 8 can, in such a case, advantageously consist of an electronic circuit mounted on the same printed circuit where the electronic circuits of the electronic device 3 are arranged, or it can be embodied in a microprocessor of the electronic device 2.

By providing that the controller 8 is part of the electronic device 3, the power supply device 2 is more cost-effective, an advantageous aspect when two or more interchangeable removable power supply devices 2 of the rechargeable type are foreseen. To provide for the power regulator SW to be in any case part of the power supply device 2 can be advantageous when the power regulator SW is a solid-state device, for example, of the MOSFET type, since during its actuation and deactuation it undergoes heating caused by switching losses. The heat produced by such losses is advantageously exploited to heat the power supply unit 4, in addition to the heat produced by the heating element 6.

Moreover, a single sensor 17 of the atmospheric temperature Tatm suffices in the case in which two or more interchangeable removable power supply devices 2 are provided.

Figure 13:
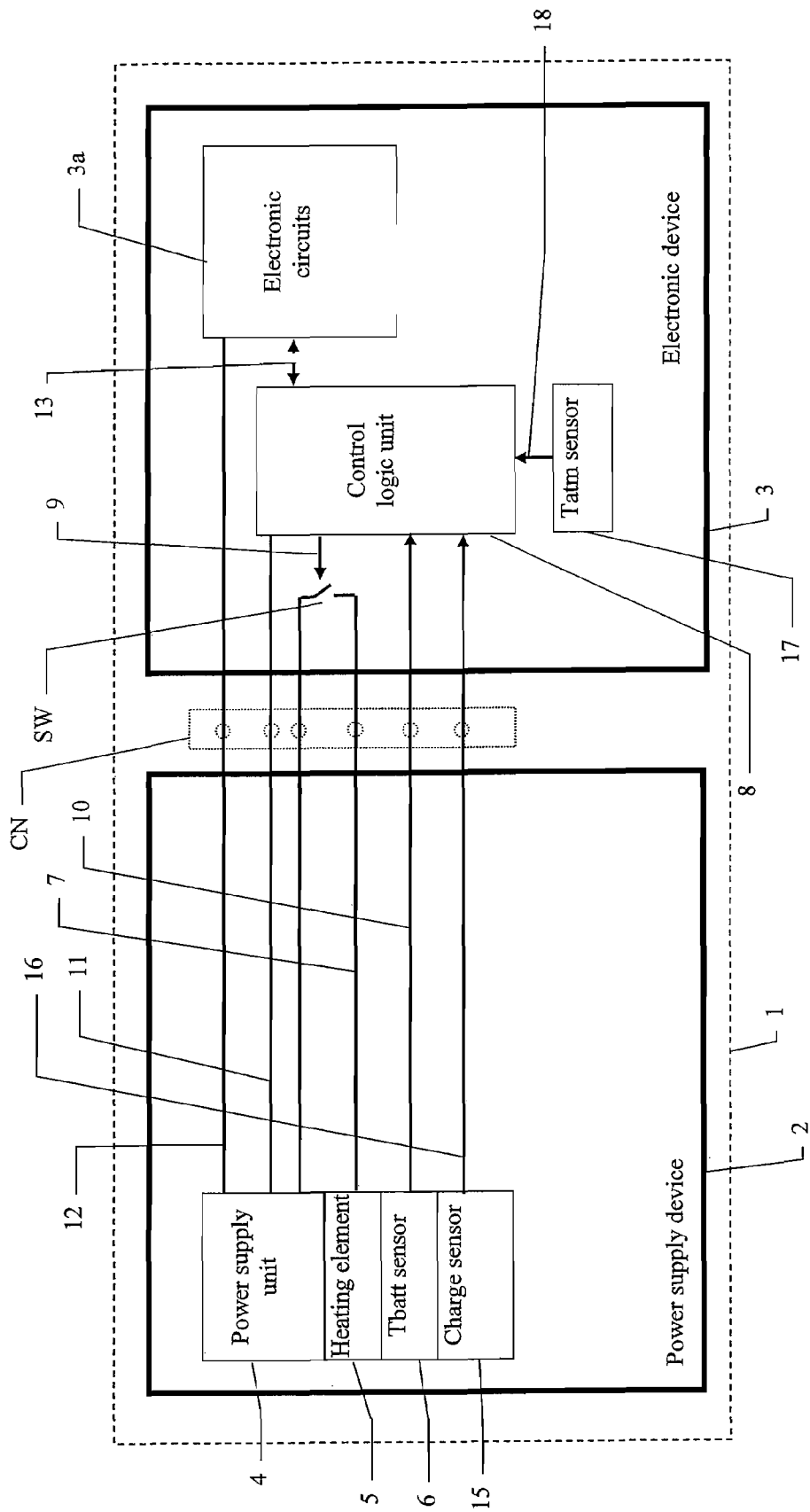
FIG. 13 is a block diagram of a seventh embodiment of the system of the invention.

It is, however, possible to provide that the power regulator SW to be part of the electronic device 3, as illustrated in the seventh embodiment of the system according to the invention shown in FIG. 13. The embodiment of FIG. 13 is otherwise the same as the embodiment of FIG. 12.

Figure 14:
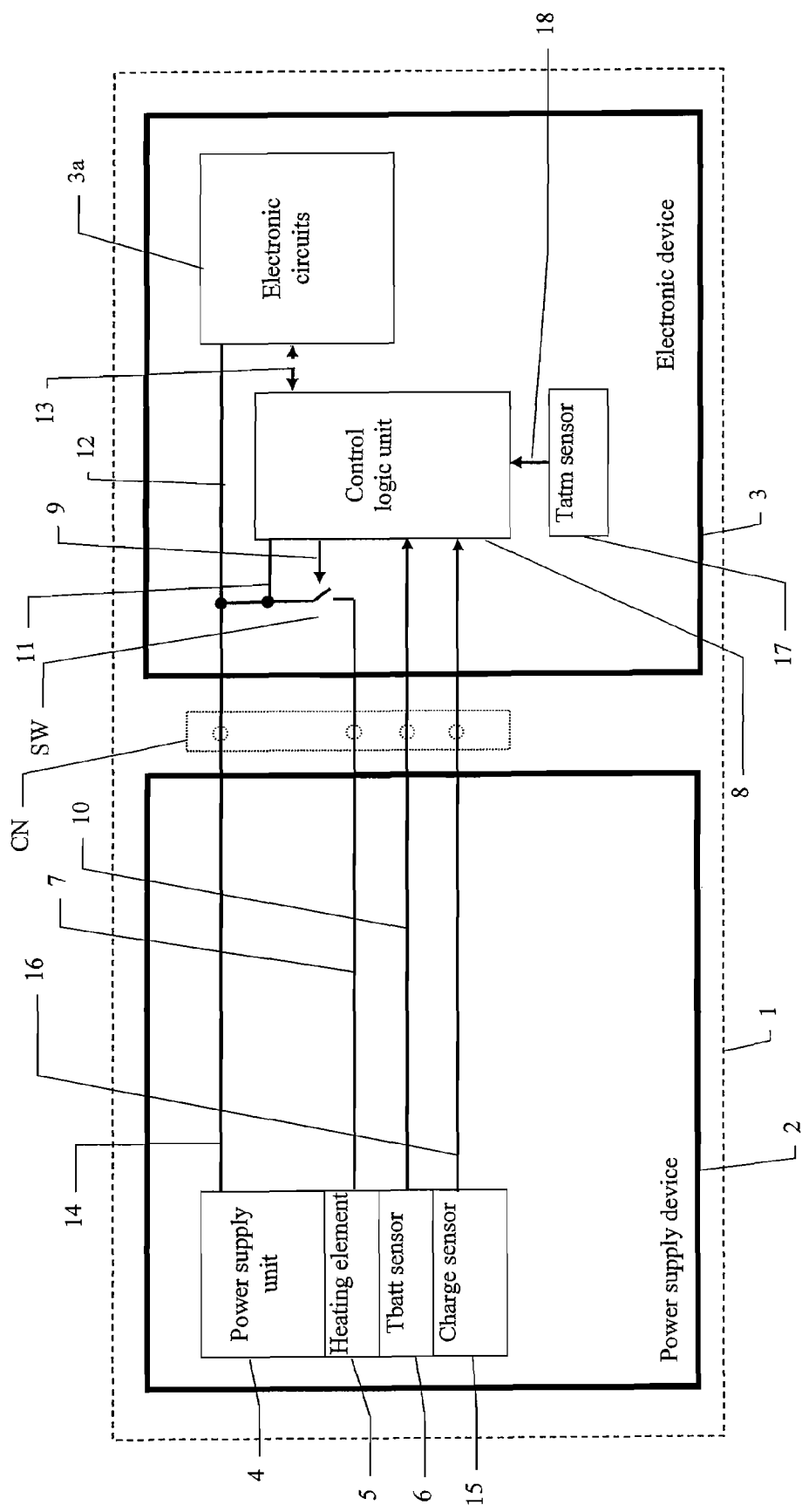
FIG. 14 is a block diagram of an eighth embodiment of the system of the invention.

An eighth embodiment of the system according to the invention is illustrated in FIG. 14.

The embodiment of FIG. 14 differs from the embodiment of FIG. 13 in that the power supply lines 11 and 12 for the controller 8 and for the electronic circuits 3a of the electronic device 3, as well as the electrical connection 7 to the heating element 5, provided with the power regulator SW, consist, on the side of the power supply unit 4, of a single power supply line 14. Such a configuration is advantageous when the power supply device 2 and the electronic device 3 are removably connectable through the pair of connectors CN, since the number of contacts is particularly small.

Although not shown, in the embodiments of FIGS. 11 to 14, the charge sensor 15 could alternatively be part of the electronic device 3, in particular when two or more interchangeable removable power supply devices 2 are provided, even if in this case it would have to carry out an instantaneous detection of the charge as it would be unable to keep track of the supplied current.

In a fourth embodiment of the method according to the invention, that can be carried out with the system of one of the embodiments of FIGS. 11-14, in addition to the lower temperature threshold Tlow and maximum temperature difference $\Delta T_{max}$ parameters defined above, the following parameter is used, stored in the controller 8 and possibly settable through the interface of the electronic device 3:

Chmin=minimum charge value of the battery, selected experimentally and based upon the type of power supply unit 4 used, which ensures the heating and acceptable performance of the system in critical operating atmospheric conditions, i.e., when $\Delta T$ is equal to $\Delta T_{max}$, for a sufficient time, for example, for at least three hours; for example, Chmin is expressed as a percentage of the maximum charge of the power supply unit 4 and is preferably equal to 75% of the maximum charge of the power supply unit 4.

The following variable, calculated by the controller 8, is also used:

$\Delta T$=temperature difference between the lower threshold value Tlow and the value of the atmospheric temperature Tatm detected by the temperature sensor 15, $\Delta T$=Tlow−Tatm.

Figure 15:
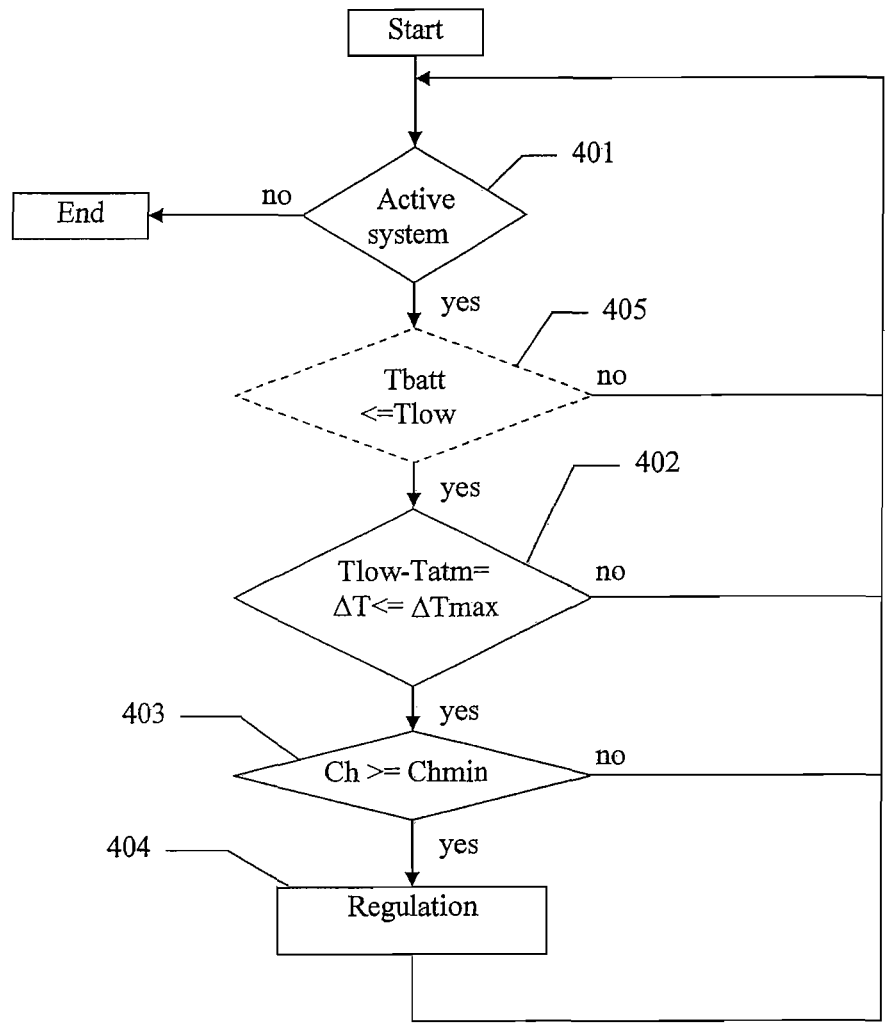
FIG. 15 is a block diagram of a fourth embodiment of the method of the invention.

With reference to FIG. 15, in the optional block 401 the control logic unit or controller 8 checks whether the system is active, similarly to the block 101 of the first embodiment of the method described above.

If in block 401 the system is active, an optional block 405 can be provided wherein it is checked whether the detected value Tbatt is less than or equal to the lower temperature threshold value Tlow or Tref. In the negative case, the subsequent checks are avoided since the power supply unit 4 does not need to be heated.

If the system is active and the possible check of block 405 has a positive outcome, one goes on to block 402 where the comparison between value $\Delta T$ and value $\Delta T_{max}$ is carried out. If the value of $\Delta T$ is greater than $\Delta T_{max}$ it is considered that the system and, in particular, the power supply unit 4, is unable to self-heat sufficiently and, therefore, one does not proceed in the cycle.

If, on the other hand, $\Delta T$ is less than or equal to $\Delta T_{max}$, one passes to block 403 where the comparison between the residual charge value Ch detected by the charge sensor 15 and the minimum charge value Chmin is carried out. If the residual charge value Ch is less than Chmin it is considered that the system and, in particular, the power supply unit 4, is unable to self-heat sufficiently and, therefore, one does not proceed in the cycle.

If, on the other hand, the residual charge value Ch is greater than or equal to Chmin, one goes on to block 404 where the regulation of the temperature of the power supply unit 4 is carried out. The regulation of the temperature of the power supply unit 4 carried out in block 404 can be performed, for example, in accordance with one of the methods described with reference to FIGS. 5 to 8. When using one of such methods, the check of whether the system is active of blocks 101, 201, and 301 of FIGS. 5, 6, and 7, respectively, can be omitted since such a check is carried out beforehand in block 401.

In a fifth embodiment of the method according to the invention that can be carried out with the system of one of FIGS. 11-14, the lower temperature threshold Tlow parameter and the temperature difference $\Delta T$ variable defined above are used. A parameter function, stored in the controller 8 and possibly settable through the interface of the electronic device 3, is also used:

Chmin($\Delta T$)=minimum residual charge value of the battery, selected experimentally and based upon the type of power supply unit 4 used, which ensures the heating and acceptable performance of the system as a function of the temperature difference $\Delta T$ between the lower threshold value Tlow and the atmospheric temperature value Tatm detected by the temperature sensor 17, $\Delta T$=Tlow−Tatm.

Figure 17:
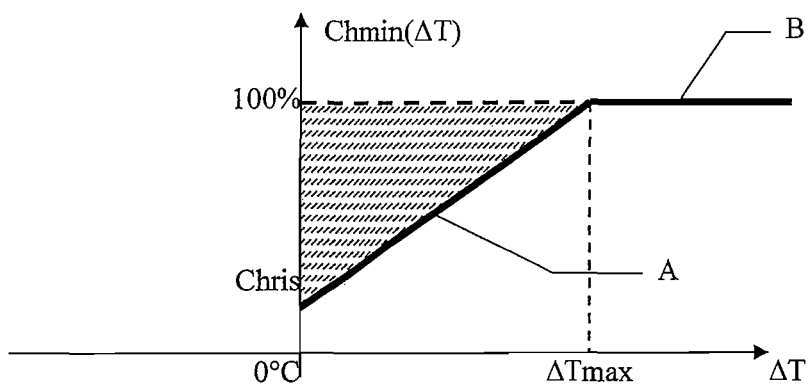
FIG. 17 illustrates a function used in the fifth embodiment of the method of the invention.

A preferred progression of the parameter function Chmin($\Delta T$) is illustrated in FIG. 17 and comprises:
- a zone A with linear progression starting from a reserve charge value Chris, for example, 30% of the maximum charge of the power supply unit 4, to the final value of 100% or maximum charge of the power supply unit 4, for temperature difference values $\Delta T$ comprised between 0° C. and a maximum value $\Delta T_{max}$, for example 15° C.; the reserve charge value Chris is selected in order to set a minimum charge threshold below which the self-heating of the power supply unit is in any case not allowed, but alternatively such a value could also be zero; and
- a zone B with constant progression of Chmin($\Delta T$), equal to 100% of the maximum charge of the power supply unit 4, for temperature difference values $\Delta T$ greater than the maximum temperature difference $\Delta T_{max}$.

Still alternatively, the reserve charge value Chris could be a parameter settable by the user through the interface of the electronic device 3 based, for example, upon the foreseen time of use of the bicycle before recharging the power supply unit 4.

It should be noted that the parameter Tlow and the parameter $\Delta T_{max}$ defined above are also implicitly used. The parameter Tlow is indeed used in the calculation of the parameter $\Delta T$, and the parameter $\Delta T_{max}$ is used in the parameter function Chmin($\Delta T$). Alternatively, such parameters could be used explicitly and be settable by the user, for example, through the interface of the electronic device 3. The zone A of the function Chmin($\Delta T$) would in this case be calculated as Chmin($\Delta T$)=Chris+(100%−Chris)*$\Delta T/\Delta T_{max}$.

Figure 16:
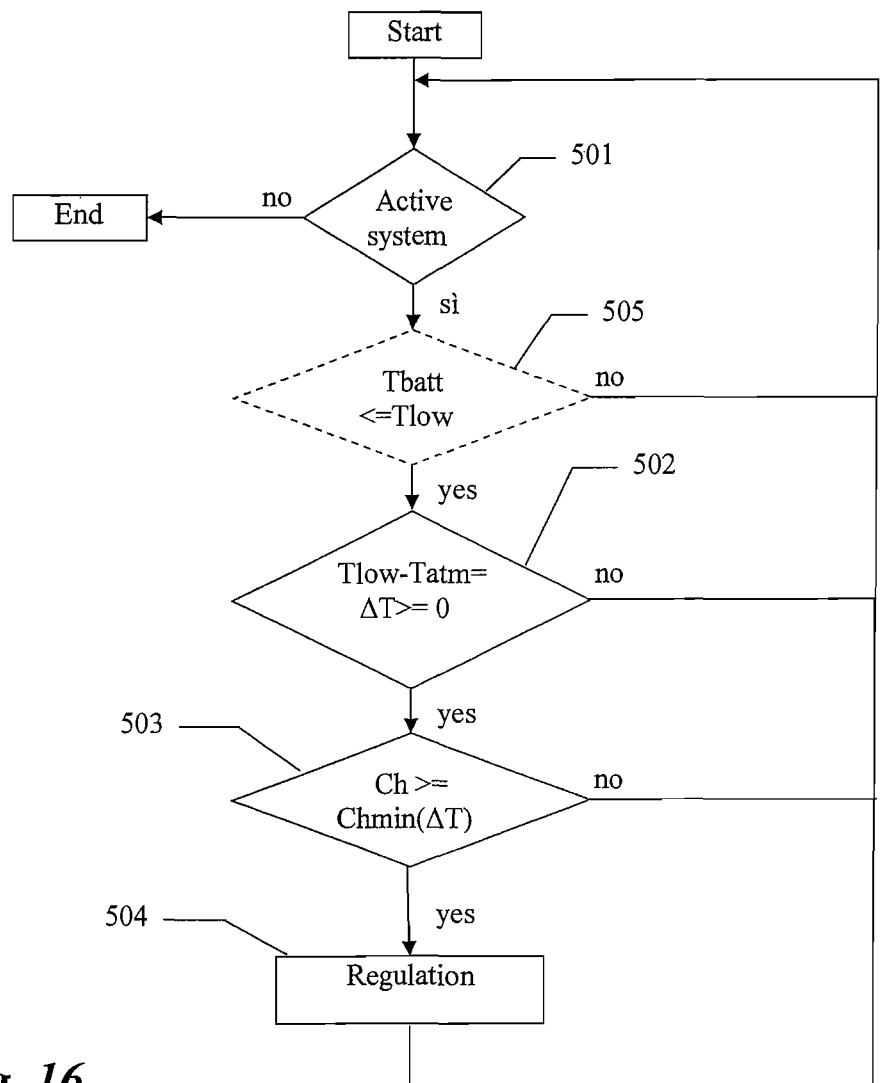
FIG. 16 is a block diagram of a fifth embodiment of the method of the invention.

With reference to FIG. 16, in the optional block 501 the control logic unit 8 checks whether the system is active, similar to block 101 of the first embodiment of the method described above.

If in block 501 the system is active, an optional block 505 can be provided where it is checked whether the detected value Tbatt is less than or equal to the lower temperature threshold value Tlow or Tref. In the negative case, the subsequent checks are avoided since the power supply unit 4 does not need to be heated.

If the system is active and the possible check of block 505 has a positive outcome, one goes on to block 502 where it is checked whether the value of $\Delta T$ is greater than or equal to zero.

In the negative case, the system 1 does not need to self-heat since the atmospheric temperature Tatm is higher than the preselected lower temperature threshold Tlow.

If the check has a positive outcome, i.e., if $\Delta T$ is greater than or equal to zero, one goes on to block 503 where a comparison is carried out between the residual charge value Ch detected by the charge sensor 15 and the minimum charge value Chmin($\Delta T$) corresponding to the temperature difference value $\Delta T$. If the residual charge value Ch is less than the minimum charge value Chmin($\Delta T$) corresponding to the temperature difference value $\Delta T$, it is considered that the system, and in particular the power supply unit 4, is unable to self-heat and, therefore, one does not proceed in the cycle.

If, on the other hand, the residual charge value Ch is greater than or equal to the minimum charge value Chmin($\Delta T$) corresponding to the temperature difference value $\Delta T$, one goes on to block 504 where the regulation of the temperature of the power supply unit 4 is carried out. The regulation of the temperature of the power supply unit 4 carried out in block 504 can be performed, for example, in accordance with one of the methods described with reference to FIGS. 5 to 8. When using one of such methods, the check of whether the system is active of blocks 101, 201, and 301 of FIGS. 5, 6, and 7, respectively, can be omitted since such a check is performed beforehand in block 501.

The regulation of the temperature of the power supply unit 4 of block 504 can therefore be carried out when the system is in the hatched area of FIG. 17.

In a sixth embodiment of the method according to the invention that can be carried out with the system of one of the embodiments of FIGS. 11-14, the parameter $\Delta T$ defined above and the parameter function Chmin($\Delta T$) are used.

Figure 19:
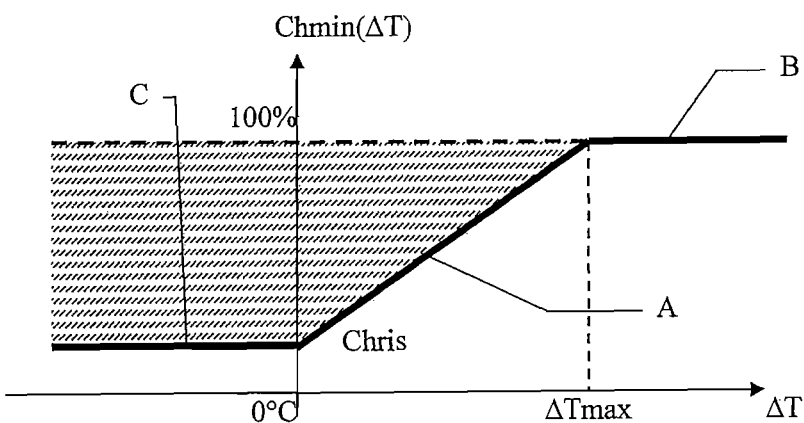
FIG. 19 illustrates a function used in the sixth embodiment of the method of the invention.

Unlike the fifth embodiment of the method described above, the preferred progression of the parameter function Chmin($\Delta T$), illustrated in FIG. 19, further comprises:
- a zone C with constant progression of Chmin($\Delta T$), equal to the reserve charge value Chris, for example, equal to 30% of the maximum charge of the power supply unit 4, for temperature difference values $\Delta T$ less than 0° C.

Also in this case, the reserve charge value Chris could be a parameter settable by the user through the interface of the electronic device 3 based, for example, upon the foreseen time of use of the bicycle before recharging the power supply unit 4.

It should be noted that also in this case the parameter Tlow and the parameter $\Delta T_{max}$ defined above are also implicitly used. The parameter Tlow is indeed used in the calculation of the parameter $\Delta T$, and the parameter $\Delta T_{max}$ is used in the parameter function Chmin($\Delta T$). Alternatively, such parameters could be used explicitly and be settable by the user, for example, through the interface of the electronic device 3. The zone A of the function Chmin($\Delta T$) would in that case be calculated as Chmin($\Delta T$)=Chris+(100%−Chris)*$\Delta T/\Delta T_{max}$.

Figure 18:
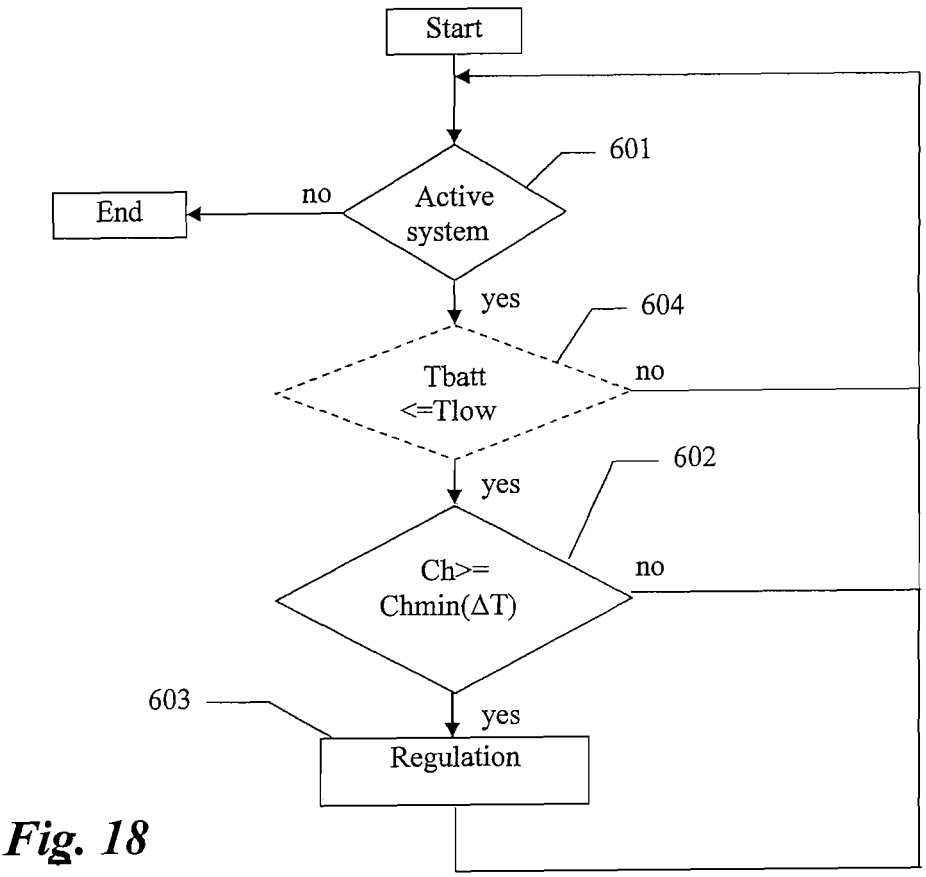
FIG. 18 is a block diagram of a sixth embodiment of the method of the invention.

With reference to FIG. 18, in the optional block 601 the control logic unit 8 checks whether the system is active, similar to block 101 of the first embodiment of the method described above.

If in block 601 the system is active, an optional block 604 can be provided where it is checked whether the detected value Tbatt is less than or equal to the lower temperature threshold value Tlow or Tref. In the negative case, the subsequent checks are avoided since the power supply unit 4 does not need to be heated.

In case the system is active and the possible check of block 604 has a positive outcome, one goes on to block 602 where it is checked whether the residual charge value Ch is greater than or equal to the minimum residual charge Chmin($\Delta T$) corresponding to the temperature difference value $\Delta T$.

If the residual charge value Ch is less than the minimum charge value Chmin($\Delta T$) corresponding to the temperature difference value $\Delta T$, it is considered that the system and, in particular, the power supply unit 4, is unable to self-heat sufficiently and, therefore, one does not proceed in the cycle.

If, on the other hand, the residual charge value Ch is greater than or equal to the minimum charge value Chmin (ΔT) corresponding to the temperature difference value ΔT, one goes on to block 603 where the regulation of the temperature of the power supply unit 4 is carried out. The regulation of the temperature of the power supply unit 4 carried out in block 603 can be performed, for example, in accordance with one of the methods described with reference to FIGS. 5 to 8. When using one of such methods, the check of whether the system is active of blocks 101, 201, and 301 of FIGS. 5, 6, and 7, respectively, can be omitted since such a check is performed beforehand in block 601.

The regulation of the temperature of the power supply unit 4 of block 603 can therefore be carried out when the system is in the hatched area of FIG. 19.

In a seventh embodiment of the method according to the invention that can be carried out with the system of one of the embodiments of FIGS. 11-14, the lower temperature threshold Tlow parameter and the temperature difference ΔT variable defined above are used. A parameter function is also used, stored in the controller 8 and possibly settable through the interface of the electronic device 3:

$\Delta T_{max}(Ch)$=maximum temperature difference value, selected experimentally and based upon the type of power supply unit 4 used, at which the heating and acceptable performance of the system are ensured as a function of the residual charge Ch detected by the charge sensor 15.

Figure 21:
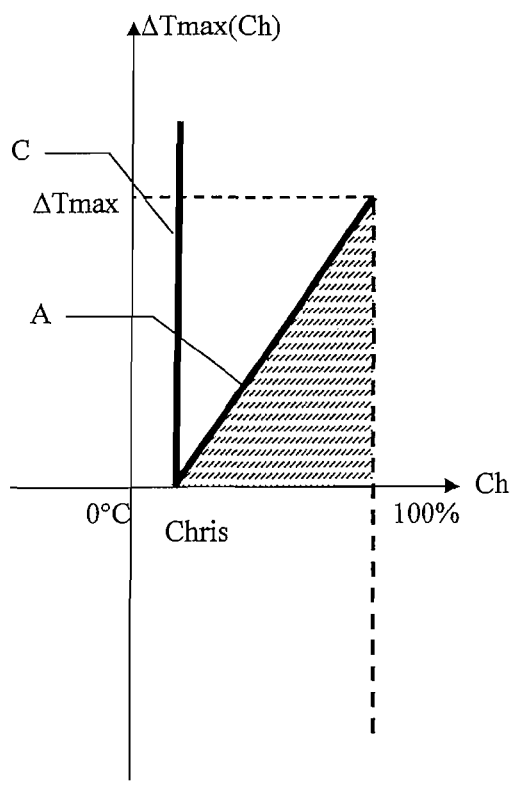
FIG. 21 illustrates a function used in the seventh embodiment of the method of the invention.
Figure 22:
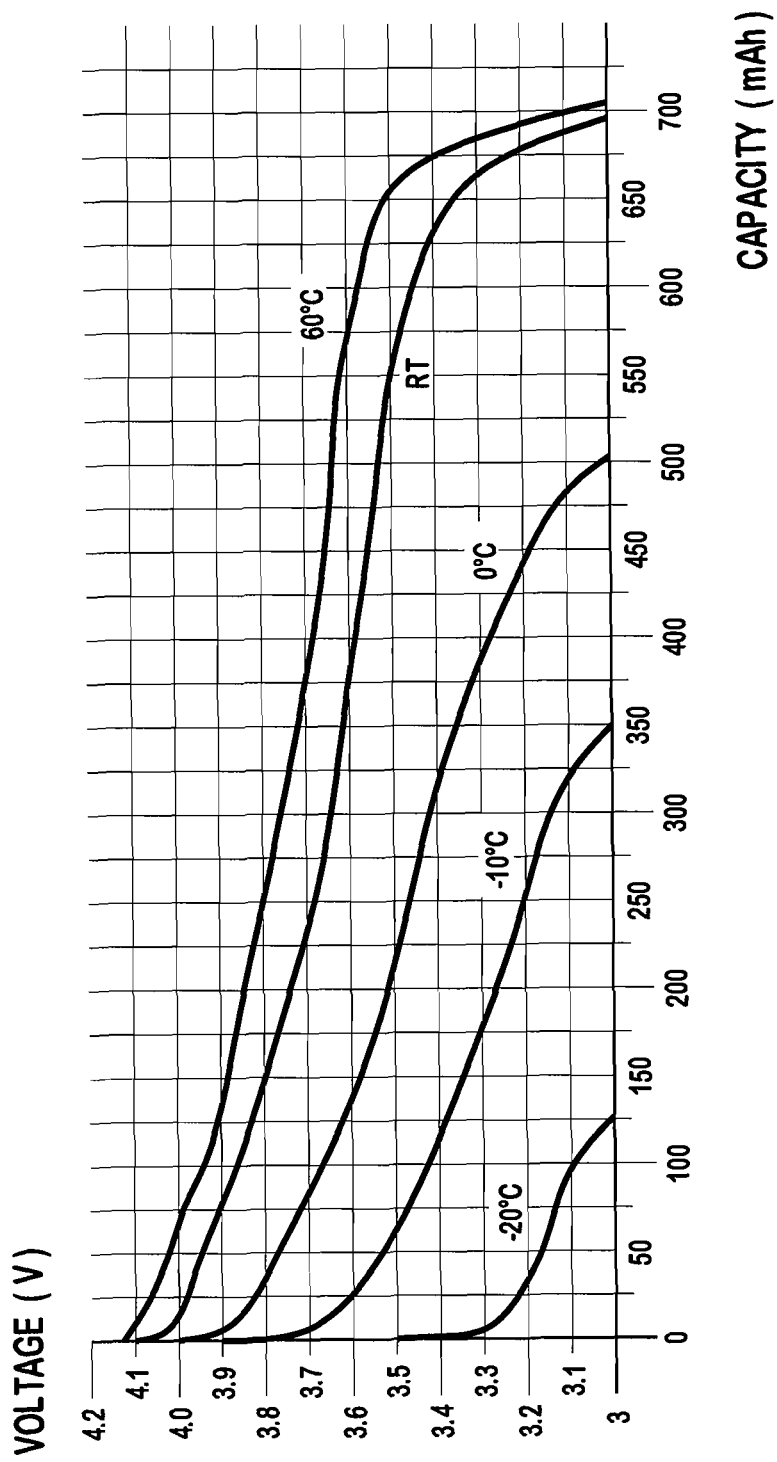
FIG. 22 shows characteristic curves of a battery power supply unit.

A preferred progression of the parameter function ΔTmax (Ch), illustrated in FIG. 21, substantially mirrors the progression of the parameter function Chmin(ΔT) of the embodiment of FIG. 19, and it is linear and increasing from 0° C. to a maximum value $\Delta T_{max}$, for example 15° C., for residual charge values comprised between a reserve charge value Chris, for example 30% of the maximum charge of the power supply unit 4, and the final value of 100% or maximum charge of the power supply unit 4; the reserve charge value Chris is selected in order to set a minimum charge threshold below which the self-heating of the power supply unit is in any case not allowed, but alternatively such a value could also be zero.

Above the final value of 100% or maximum charge of the power supply unit 4, the parameter function ΔTmax(Ch) is not defined, of course. Below the reserve charge Chris, the parameter function ΔTmax(Ch) is set at infinity.

Also in this case, the reserve charge value Chris could be a parameter settable by the user through the interface of the electronic device 3 based, for example, upon the foreseen time of use of the bicycle before recharging the power supply unit 4.

Figure 20:
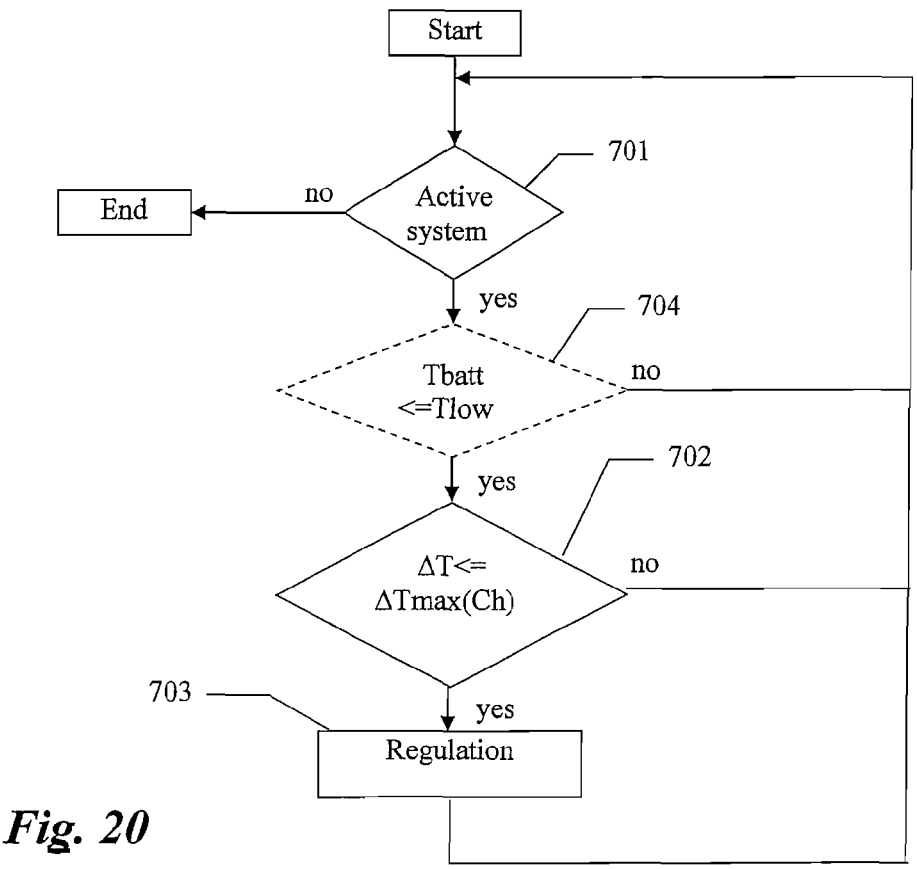
FIG. 20 is a block diagram of a seventh embodiment of the method of the invention.

With reference to FIG. 20, in optional block 701 the control logic unit 8 checks whether the system is active, similar to block 101 of the first embodiment of the method described above.

If in block 701 the system is active, an optional block 704 can be provided, where it is checked whether the detected value Tbatt is less than or equal to the lower temperature threshold value Tlow or Tref. In the negative case, the subsequent checks are avoided since the power supply unit 4 does not need to be heated.

In case the system is active and the possible check of block 704 has a positive outcome, one goes on to block 702 where it is checked whether the value of ΔT is less than or equal to the maximum temperature difference value corresponding to the residual charge value Ch detected by the charge sensor 15, i.e., whether ΔT<=ΔTmax(Ch).

In the negative case, it is considered that the system and, in particular, the power supply unit 4, is unable to self-heat and, therefore, one does not proceed in the cycle.

In the affirmative case, one goes on to block 704 where the regulation of the temperature of the power supply unit 4 is carried out. The regulation of the temperature of the power supply unit 4 carried out in block 704 can be performed, for example, in accordance with one of the methods described with reference to FIGS. 5 to 8. When using one of such methods, the check of whether the system is active of blocks 101, 201, and 301 of FIGS. 5, 6, and 7, respectively, can be omitted since such a check is carried out beforehand in block 701.

The regulation of the temperature of the power supply unit 4 of block 704 can therefore be carried out when the system is in the hatched area of FIG. 21.

In the various embodiments of the system described above, if the power supply unit 4 comprises several batteries, a plurality of temperature sensors 6 can be provided to detect the respective temperatures. The various embodiments of the method of the invention described above can, in this case, be implemented with respect to the individual temperatures should a plurality of heating elements 5 also be provided, or with respect to the average temperature or to the minimum temperature among those of the various batteries making up the power supply unit 4.

In the case of the fourth, fifth, sixth, and seventh embodiment of the method of the invention, the temperature value of the power supply unit Tbatt detected by the sensor 6 can be used instead of the atmospheric temperature value Tatm detected by the sensor 17 which, in this case, can be missing. In this case it is assumed that at the time of the checks carried out on such a single temperature value, namely before carrying out the self-heating of the power supply unit in blocks 404, 504, 603, and 703, the power supply unit 4 is substantially at atmospheric temperature. In the case of a relatively brief time on stand-by, this could not be true since the power supply unit 4 may not yet have cooled down to the air temperature. In any case, what is most relevant is the temperature of the power supply unit 4 itself and in any case carrying out the various checks of the method according to the invention on the atmospheric temperature Tatm means at most carrying out a pointless self-heating of the power supply unit 4.

As far as the regulation of the temperature of the power supply unit 4 of block 603 of the sixth embodiment of the method of the invention is concerned, when the temperature Tbatt of the power supply unit 4 detected by the sensor 6 is directly used instead of the atmospheric temperature Tatm detected by the sensor 17, the regulation in the zone of the negative temperature difference values ΔT shall actually be prevented by the check carried out during the regulation itself, according to blocks 102, 202, and 302 of the embodiments of FIGS. 5-8.

Those skilled in the art shall understand that several changes, additions, eliminations, and replacements can be made to the embodiments described above without departing from the scope of protection of the invention defined by the attached claims. In particular, the order and the repetition of the various checks carried out in the various described embodiments can change with respect to what is indicated.

What is claimed is:
1. Bicycle electronic device, comprising:
a connector for receiving electrical energy from a power supply unit having a maximum nominal capacity, at least one battery, at least one heating element thermally coupled with the at least one battery, and a battery temperature sensor associated with the at least one battery; and a controller that receives an input signal from the battery temperature sensor indicative of a temperature of the at least one battery and provides a signal for switching part of the electrical energy of the power supply unit towards the heating element when the detected temperature of the at least one battery is less than or equal to a predetermined lower temperature threshold and the power supply unit has a nominal capacity that is greater than 5% of the maximum nominal capacity of the power supply unit.

2. Device according to claim 1, further comprising a power regulator for regulating the switching of the part of electrical energy, driven by the signal provided by the controller.

3. Device according to claim 1, further comprising a sensor of atmospheric temperature, an output of which is supplied to the controller.

4. Method for controlling battery temperature in an electrical energy power supply unit for powering a bicycle electronic device, comprising the steps of:

providing a power supply unit that has at least one battery with a maximum nominal capacity, and a predetermined lower temperature threshold that is selected to ensure a minimum nominal capacity of the power supply unit is no less than 5% of the maximum nominal capacity;

providing at least one battery temperature sensor associated with the at least one battery;

providing at least one heating element thermally coupled with the at least one battery;

detecting through said at least one battery temperature sensor a temperature associated with the at least one battery;

checking operative conditions of the power supply unit, including checking whether the detected temperature associated with the at least one battery is less than or equal to the predetermined lower temperature threshold;

and, if the checking step has a positive outcome, electrical energy from the power supply unit is supplied to said at least one heating element provided that a remaining minimum nominal capacity of the power supply unit is at least 5% of the maximum nominal capacity of the power supply unit.

5. Method according to claim 1, wherein the predetermined lower temperature threshold is selected so as to ensure a capacity of the power supply unit of 40% of the maximum nominal capacity of the power supply unit.

6. Method according to claim 1, wherein the predetermined lower temperature threshold is −4° C.

7. Method according to claim 1, wherein the checking step comprises checking whether the detected temperature is lower than an upper temperature threshold.

8. Method according to claim 7, wherein the upper temperature threshold is selected so as to ensure a capacity of the power supply unit of about 75% of a maximum nominal capacity of the power supply unit.

9. Method according to claim 7, wherein the upper temperature threshold is 4° C.

10. Method according to claim 4, wherein the electrical energy from the power supply unit to the at least one heating element is supplied as a function of a difference between the lower temperature threshold and a temperature proportional to the detected temperature.

11. Method according to claim 10, wherein the function is of the proportional, integrative and/or derivative type.

12. Method according to claim 1, wherein the step of detecting at least one temperature comprises detecting the temperature of each of a plurality of batteries of the battery power supply unit.

13. Method according to claim 1, wherein the checking step comprises checking whether a difference between the lower temperature threshold and the detected temperature is less than or equal to a maximum temperature difference.

14. Method according to claim 13, wherein the maximum temperature difference is a constant value.

15. Method according to claim 14, wherein the maximum temperature difference is equal to 15° C.

16. Method according to claim 14, wherein the maximum temperature difference is a non-decreasing function of a residual charge of the power supply unit.

17. Method according to claim 13, wherein the detected temperature is the atmospheric temperature.

18. Method according to claim 1, further comprising the step of detecting a residual charge of the power supply unit, wherein the checking step comprises checking whether the residual charge is greater than a minimum residual charge.

19. Method according to claim 18, wherein the minimum residual charge is a constant percentage value of a maximum charge of the power supply unit.

20. Method according to claim 19, wherein the minimum residual charge is equal to 75% of the maximum charge of the power supply unit.

21. Method according to claim 19, wherein the minimum residual charge is a non-decreasing function of the temperature difference.

22. Method according to claim 21, wherein the minimum residual charge is an increasing function of the temperature difference in the temperature difference range comprised between 0° C. and a maximum temperature difference, is equal to a residual reserve charge for a temperature difference equal to 0° C., and is equal to a maximum charge of the power supply unit for temperature differences greater than or equal to the maximum temperature difference.

23. Method according to claim 22, wherein the increasing function of the temperature difference in the temperature difference range comprised between 0° C. and a maximum temperature difference is linear.

24. Method according to claim 22, wherein the minimum residual charge is equal to a residual reserve charge for temperature differences less than 0° C.

25. Method according to claim 22, wherein the residual reserve charge is equal to 30% of the maximum charge of the power supply unit.

26. Method according to claim 18, wherein the detected temperature is the atmospheric temperature.

27. Method according to claim 1, wherein the checking step comprises checking whether the electronic device is active.

28. Method according to claim 1, wherein electrical energy from the power supply unit is supplied to a plurality of heating elements, each of which is thermally coupled with a respective one of a plurality of batteries of the power supply unit.

29. Method according to claim 1, further comprising a step of supplying electrical energy to the electronic device.

30. Method according to claim 29, wherein the step of supplying electrical energy to the electronic device occurs when the detected temperature is higher than the predetermined lower temperature threshold.

31. Power supply system comprising:
a battery power supply unit having at least one battery, a maximum nominal capacity, and a predetermined lower temperature threshold;
at least one temperature sensor for sensing the temperature of the at least one battery;
at least one heating element thermally associated with the at least one battery;
a selectively actuable electrical connection from the power supply unit to the heating element; and
a controller that checks operative conditions of the system, including whether a detected temperature from the at least one temperature sensor is less than or equal to the predetermined lower temperature threshold and, if the check has a positive outcome, actuates the electrical connection to supply electrical energy from the power supply unit to the heating element when a nominal capacity of the power supply unit is greater than 5% of the maximum nominal capacity of the power supply unit.

32. System according to claim 31, comprising an electrical connection from the power supply unit to a bicycle electronic device.

33. System according to claim 31, further comprising a bicycle electronic device.

34. System according to claim 31, wherein the operative conditions further include whether the detected temperature is less than an upper temperature threshold.

35. System according to claim 31, wherein the controller actuates the electrical connection through a power regulator selected from the group consisting of relays and solid-state devices.

36. System according to claim 35, wherein the heating element is of the resistive type and the heating controller comprises a multiplier of an output signal of the at least one temperature sensor, a subtractor for subtracting an output of the multiplier from the lower temperature threshold and for obtaining an error signal, and a P.I.D. (proportional-integral-derivative) type power regulator block acting upon the error signal to output a driving signal for the power regulator.

37. System according to claim 36, wherein the driving signal at the output of the P.I.D. power regulator block causes a voltage value at ends of the heating element, or a current value through the heating element, that increases as the error signal increases.

38. System according to claim 36, wherein the P.I.D. power regulator block causes a modulated voltage at ends of the heating element, or a modulated current through the heating element, the duty cycle of which increases as the error signal increases.

39. System according to claim 31, wherein the at least one temperature sensor comprises at least one temperature sensor thermally coupled with the at least one battery.

40. System according to claim 39, wherein the power supply unit comprises at least two batteries, and at least one temperature sensor is thermally associated with each battery.

41. System according to claim 31, wherein the at least one temperature sensor comprises a thermistor.

42. System according to claim 31, wherein the operative conditions further include whether a difference between the lower temperature threshold and the detected temperature is less than or equal to a maximum temperature difference.

43. System according to claim 42, wherein the at least one sensor of a temperature indicative of the temperature of the power supply unit comprises a sensor of atmospheric temperature to provide the detected temperature used to evaluate the temperature difference.

44. System according to claim 31, further comprising a residual charge sensor, and in the operative conditions further include whether the residual charge is greater than a minimum residual charge.

45. System according to claim 31, wherein the at least one heating element comprises at least one resistive sheet applied to the power supply unit.

46. System according to claim 31, wherein the power supply unit comprises at least two batteries, and each battery is thermally associated with at least one heating element.

47. System according to claim 31, wherein its components are housed in a single casing that can be fixed to the frame of a bicycle.

48. System according to claim 31, wherein the power supply unit is housed in a first casing and the electronic device is housed in a second casing, the first and the second casing being mechanically and electrically removably connectable.

49. System according to claim 48, wherein the controller is housed in the first casing.

50. System according to claim 48, wherein the controller is housed in the second casing.

51. System according to claim 48, wherein a power regulator for the selective actuation of the electrical connection is housed in the first casing.

52. System according to claim 48, wherein a power regulator for the selective actuation of the electrical connection is housed in the second casing.

53. System according to claim 48, wherein the selectively actuable electrical connection is shunted from an electrical connection from the power supply unit to the electronic device.

54. System according to claim 53, wherein a residual charge sensor of the power supply unit is housed in the first casing.

55. System according to claim 53, wherein at least one atmospheric temperature sensor is housed in the first casing.

56. System according to claim 53, wherein at least one atmospheric temperature sensor is housed in the second casing.

57. System according to claim 31, wherein the battery power supply unit is of a rechargeable type.

58. Method for controlling battery temperature in an electrical energy power supply unit for powering a bicycle electronic device, comprising the steps of:
providing a power supply unit that has at least one battery, a maximum nominal capacity, and a predetermined lower temperature threshold that is selected to ensure a minimum nominal capacity of the power supply unit that is no less than 5% of a maximum nominal capacity;
providing at least one battery temperature sensor associated with the at least one battery;
providing at least one heating element thermally coupled with the at least one battery;
detecting through said at least one battery temperature sensor a temperature associated with the at least one battery;
checking operative conditions of the power supply unit, including checking whether the detected temperature associated with the at least one battery is less than or equal to the predetermined lower temperature threshold;
and, if the checking step has a positive outcome;
supplying electrical energy from the power supply unit to said at least one heating element as a function of a difference between the predetermined lower temperature threshold and a temperature proportional to the detected temperature associated with the at least one battery when the power supply unit has a nominal capacity greater than at least 5% of the maximum nominal capacity of the power supply unit.

59. Method for controlling battery temperature in an electrical energy power supply unit for powering a bicycle electronic device, comprising the steps of:

providing a power supply unit that has at least one battery with a maximum nominal capacity, and a predetermined lower temperature threshold that is selected to ensure a remaining minimum nominal capacity of the power supply unit is no less than 5% of the maximum nominal capacity;

providing at least one battery temperature sensor associated with the at least one battery;

providing at least one heating element thermally coupled with the at least one battery;

detecting through said at least one battery temperature sensor a temperature associated with the at least one battery;

checking operative conditions of the power supply unit, including checking whether the detected temperature associated with the at least one battery is less than or equal to the predetermined lower temperature threshold;

and, if the checking step has a positive outcome, electrical energy from the power supply unit is supplied to said at least one heating element provided that the remaining minimum nominal capacity of the power supply unit is at least 5% of the maximum nominal capacity of the power supply unit.

* * * * *